United States Patent
Chung et al.

(10) Patent No.: US 10,256,743 B2
(45) Date of Patent: Apr. 9, 2019

(54) METHOD AND APPARATUS FOR REGULATING AN ELECTRICAL POWER SOURCE BASED ON GLOBAL AND LOCAL MAXIMUM LOAD POWER

(71) Applicants: City University of Hong Kong, Kowloon (HK); ProVista Technology Limited, Kowloon (HK)

(72) Inventors: Shu Hung Henry Chung, Mid-Levels (HK); Shun Cheung Yeung, Hung Hom (HK); Walter Marin, Kowloon (HK)

(73) Assignees: CITY UNIVERSITY OF HONG KONG, Kowloon (HK); PROVISTA TECHNOLOGY LIMITED, Kowloon (HK)

( * ) Notice: Subject to any disclaimer, the term of this patent is extended or adjusted under 35 U.S.C. 154(b) by 838 days.

(21) Appl. No.: 14/045,124

(22) Filed: Oct. 3, 2013

(65) Prior Publication Data
US 2015/0097533 A1  Apr. 9, 2015

(51) Int. Cl.
  H02M 3/04   (2006.01)
  H02M 7/48   (2007.01)
  H02J 3/38   (2006.01)
(52) U.S. Cl.
  CPC ........... *H02M 7/4807* (2013.01); *H02J 3/385* (2013.01); *Y02E 10/58* (2013.01)
(58) Field of Classification Search
  USPC ........................................................ 700/297
  See application file for complete search history.

(56) References Cited

U.S. PATENT DOCUMENTS

| | | | | | |
|---|---|---|---|---|---|
| 5,838,148 A | * | 11/1998 | Kurokami | ................. | H02J 7/35 323/299 |
| 2012/0206118 A1 | * | 8/2012 | Williams | ................ | H02J 3/385 323/282 |
| 2012/0242152 A1 | * | 9/2012 | Escobar | .................... | G05F 1/67 307/77 |

(Continued)

OTHER PUBLICATIONS

English translation of Koide et al. Japanese. Patent No. JP2005317811 (2005).*

(Continued)

*Primary Examiner* — Mohammad Ali
*Assistant Examiner* — Bernard G Lindsay
(74) *Attorney, Agent, or Firm* — Renner Kenner Greive Bobak Taylor & Weber

(57) ABSTRACT

A method for regulating an electrical power source, comprising the steps of detecting for one or more predetermined conditions associated with a load power of the electrical power source, whereupon the one or more predetermined conditions is detected, acquiring electrical characteristics of the electrical power source to determine a global maximum load power value arranged to approximate a true maximum load power of the electrical power source, and processing the global maximum load power value to determine a local maximum load power value of the electrical power source, wherein the local maximum load power value is arranged to be more accurate in approximating the true maximum load power of the electrical power source when compared with the global maximum load power value.

29 Claims, 22 Drawing Sheets

(56) References Cited

U.S. PATENT DOCUMENTS

| | | | | |
|---|---|---|---|---|
| 2012/0310436 A1* | 12/2012 | Kjaer | ........................ | G05F 1/67 |
| | | | | 700/297 |
| 2012/0320641 A1* | 12/2012 | Chapman | ................ | H02J 3/383 |
| | | | | 363/37 |
| 2013/0016536 A1* | 1/2013 | Ehlmann | ................ | H02J 3/385 |
| | | | | 363/34 |

OTHER PUBLICATIONS

Teng et al. 'Research and development of maximum power transfer tracking system for solar cell unit by matching impedance', Renewable Energy 35 (2010) pp. 845-851.*

Kar et al. 'A Novel PI Gain Scheduler for a Vector Controlled Doubly-Fed Wind Driven Induction Generator', Electrical Machines and Systems, 2005. ICEMS 2005. Proceedings of the Eighth International Conference on, vol. 2 pp. 948-953.*

Chan et al., 'DSP controlled power converter', Proceedings of 1995 International Conference on Power Electronics and Drive Systems, IEEE, 1995.*

King et al., "Measurement precautions for high-resistivity silicon solar cells," Conference Record of the Twentieth IEEE Photovoltaic Specialists Conference, Las Vegas, NV, USA, 1988, pp. 555-559 vol. 1.*

Hishikawa 'Performance measurement of dye-sensitized solar cells and organic polymer solar cells', Proc. of SPIE vol. 7052, 70520F, (2008).*

\* cited by examiner

METHOD AND APPARATUS FOR REGULATING AN ELECTRICAL POWER SOURCE BASED ON GLOBAL AND LOCAL MAXIMUM LOAD POWER

TECHNICAL FIELD

The present invention relates to a method for regulating an electrical power source, and particularly, although not exclusively, to a method to perform Maximum Power Point Tracking (MPPT) on a power generation unit of a photovoltaic system.

BACKGROUND

Electrical power source is used for providing electrical energy which may be further converted to other forms of energy such as lighting and heat which is essential for daily lives of human beings.

Photovoltaic devices, such as solar cells, are useful for converting solar energy to electrical energy. Multiple solar cells can be connected to increase the insolation area of solar energy to convert a larger amount of solar energy.

To meet the requirement of energy saving and maximize the power generation of these photovoltaic devices, various methods may be adopted to control the loading condition of the photovoltaic devices, so as to maximize the power generated by the photovoltaic devices. However, known methods may not be suitable for various insolation conditions.

SUMMARY OF THE INVENTION

In accordance with a first aspect of the present invention, there is provided a method for regulating an electrical power source, comprising the steps of:
  detecting for one or more predetermined conditions associated with a load power of the electrical power source;
  whereupon the one or more predetermined conditions is detected, acquiring electrical characteristics of the electrical power source to determine a global maximum load power value arranged to approximate a true maximum load power of the electrical power source; and
  processing the global maximum load power value to determine a local maximum load power value of the electrical power source; wherein the local maximum load power value is arranged to be more accurate in approximating the true maximum load power of the electrical power source when compared with the global maximum load power value.

In an embodiment of the first aspect, the true maximum load power is defined as a maximum available power delivered to an electrical load in association with the electrical power source within a range of operation voltage of the electrical power source operating in an operation condition.

In an embodiment of the first aspect, the one or more predetermined conditions includes a predetermined variation in the load power of the electrical power source at an operating voltage.

In an embodiment of the first aspect, the one or more predetermined conditions includes reaching a time interval that the electrical power sources has been operating.

In an embodiment of the first aspect, the step of acquiring electrical characteristics of the electrical power source to determine a global maximum load power value further includes sweeping and acquiring of an input current-voltage characteristic of the electrical power source.

In an embodiment of the first aspect, the input current-voltage characteristic includes a charging characteristic and a discharging characteristic of the electrical power source.

In an embodiment of the first aspect, determining the global maximum load power further comprises the steps of processing the input current-voltage characteristic acquired for determining the global maximum load power value.

In an embodiment of the first aspect, sweeping and acquiring the input current-voltage characteristic further comprising the steps of:
  sweeping and acquiring a first period of the input current-voltage characteristic, wherein an input voltage is arranged to sweep from an initial input voltage to a first input voltage;
  sweeping and acquiring a second period of the input current-voltage characteristic, wherein the input voltage is arranged to sweep from the first input voltage to a second input voltage; and
  sweeping and acquiring a third period of the input current-voltage characteristic, wherein the input voltage is arranged to sweep from the second input voltage to the initial input voltage.

In an embodiment of the first aspect, further comprising the steps of:
  providing a unified current-voltage profile by:
  combining the first period and the third period of the input current-voltage characteristic; and
  averaging the second period of the input current-voltage characteristic with the combined first and third period of the input current-voltage characteristic.

In an embodiment of the first aspect, further comprising the steps of updating an input voltage reference value Vref with the global maximum load power value determined, wherein the load power of the power source is varied in association with the input voltage reference value Vref.

In an embodiment of the first aspect, the local maximum load power value is determined by further comprising the steps of:
  providing a plurality of parameters of a current-voltage characteristic associated to a Thévenin equivalent circuit of the power source.

In an embodiment of the first aspect, further comprising the steps of:
  processing the parameters of the current-voltage characteristic associated to the Thévenin equivalent circuit of the power source; and
  determining if a condition for the local maximum load power value is reached.

In an embodiment of the first aspect, further comprising the steps of: providing a threshold value arranged to allow a predetermined tolerance in determining if the condition for the local maximum load power value is reached.

In an embodiment of the first aspect, further comprising the steps of:
  repeating the steps of processing the parameters of the current-voltage characteristic associated to the Thévenin equivalent circuit of the power source and determining if a condition for the local maximum load power value is reached, whereupon the condition for the local maximum load power value is reached; or
  varying the input reference voltage Vref whereupon the condition for the local maximum load power value is not reached, and then repeating the steps of processing the parameters of the current-voltage characteristic associated to the Thévenin equivalent circuit of the power source and determining if a condition for the local maximum load power value is reached, to determine if the condition for the local maximum load power value is reached, wherein the load power is varied in association with the varied Vref.

In an embodiment of the first aspect, an accuracy and/or a speed of the determination of local maximum load power value is increased by transforming the current-voltage characteristic to a quadratic profile associated with the current-voltage characteristic around the local maximum load power value.

In an embodiment of the first aspect, the accuracy and/or the speed of the determination of local maximum load power value is further increased by providing a prediction of the local maximum load power value by processing an interpolation relation and/or an extrapolation relation of the quadratic profile associated with the current-voltage characteristic.

In an embodiment of the first aspect, the input reference voltage Vref is varied by a dynamic step size associated with the interpolation relation and/or the extrapolation relation.

In an embodiment of the first aspect, the quadratic profile is obtained by three or more data points associated with the current-voltage characteristic.

In an embodiment of the first aspect, determining the local maximum load power value further comprising the steps of:
  recording an input voltage value Vin and an input current value Iin;
  varying the input reference voltage Vref with a predetermined step size ΔVref;
  recording the input voltage value Vin and the input current value Iin;
  processing the input voltage value Vin and the input current value Iin and the parameters of the current-voltage characteristic associated to the Thévenin equivalent circuit of the power source;
  increasing the input reference voltage Vref with a predetermined step size ΔVref whereupon the condition that the local maximum load power value is greater is reached, or decreasing the input reference voltage Vref with a predetermined step size ΔVref whereupon the condition that the local maximum load power value is smaller is reached;
  recording the input voltage value Vin and the input current value Iin; and
  repeating from the processing steps until a predetermined sets of values of the input voltage value Vin and the input current value Iin are obtained.

In an embodiment of the first aspect, the method for regulating a load power of an electrical power source is implemented in a digital domain.

In an embodiment of the first aspect, determining the local maximum load power further comprising the steps of:
  providing a plurality of discretized parameters of the current-voltage characteristic associated with the Thévenin equivalent circuit of the power source;
  providing a temporary reference voltage Vtemp_ref after determining if the condition for the local maximum load power value is reached; wherein the temporary reference voltage Vtemp_ref is equal to Vref+ΔVref whereupon the condition that the local maximum load power value is greater is reached, or the temporary reference voltage Vtemp_ref is equal to Vref−ΔVref whereupon the condition that the local maximum load power value is smaller is reached;
  providing a virtual quadratic profile associated with the discretized parameters of the current-voltage characteristic associated with the Thévenin equivalent circuit of the power source;
  validating an interception point between the virtual quadratic profile and the quadratic profile;
  updating Vref to a value equal to Vtemp_ref the interception point upon unsuccessful validation; and
  repeating the steps of processing the parameters of the current-voltage characteristic associated to the Thévenin equivalent circuit of the power source and determining if a condition for the local maximum load power value is reached.

In an embodiment of the first aspect, further comprising the steps of:
  providing a backtrack reference voltage Vbacktrack with a value equals to Vtemp_ref;
  updating Vref to a value associated with the interception point;
  comparing an virtual power value Pvirtual associated with the virtual quadratic profile with a power value Pactual associated with the quadratic profile;
  updating Vref to a value equal to Vbacktrack whereupon the value of Pvirtual is not approximate to the value of Pactual; and repeating the steps of processing the parameters of the current-voltage characteristic associated to the Thévenin equivalent circuit of the power source and determining if a condition for the local maximum load power value is reached.

In an embodiment of the first aspect, further comprising the steps of:
  decreasing Vref with ΔVref; and
  repeating the steps of processing the parameters of the current-voltage characteristic associated to the Thévenin equivalent circuit of the power source and determining if a condition for the local maximum load power value is reached.

In an embodiment of the first aspect, further comprising the steps of: repeating a step of processing the local maximum load power value to update the local maximum load power value of the electrical power source.

In an embodiment of the first aspect, processing the local maximum load power value to update the local maximum load power value of the electrical power source.

In an embodiment of the first aspect, furthering comprising the steps of:
  remapping an incoming signal to a data structure for the processing the global maximum load power value and/or the local maximum load power value;
  assigning the input voltage reference to an input voltage controller for varying the load power of the power source.

In an embodiment of the first aspect, furthering comprising the steps of:
  providing a gain scheduler arranged to control one or more gain parameters of a DC-bus voltage controller, wherein the DC-bus voltage controller is operable to control the load power of the electrical power source.

In an embodiment of the first aspect, comprising the steps of:
  defining one or more profiles in the gain scheduler, wherein the gain scheduler is arranged to adjust a gain according to the profile selected depending on one or more states associated with the step of determining the global maximum load power value.

In an embodiment of the first aspect, the gain scheduler is operable to stabilize a DC-bus voltage of the DC-bus voltage controller with a faster transient response.

In an embodiment of the first aspect, further comprising the steps of:
  providing a signal to a DC-DC converter coupled to a photovoltaic device, wherein the DC-DC converter is operable to regulate an output power of a photovoltaic device, wherein the output power is the load power, and wherein the electrical power source is the photovoltaic device.

In accordance with a second aspect of the present invention, there is provided an electrical power regulating apparatus comprising:

a controller module arranged to detect for one or more predetermined conditions associated with the load power of the electrical power source;

a global maximum search module arranged to acquire electrical characteristics of the electrical power source to determine a global maximum load power value arranged to represent a true maximum load power of the electrical power source whereupon the one or more predetermined conditions is detected; and a local maximum search module arranged to process the global maximum load power value to determine a local maximum load power value of the electrical power source; wherein the local maximum load power value is arranged to be more accurate in representing the true maximum load power of the electrical power source when compared with the global maximum load power value.

In an embodiment of the second aspect, the electrical power regulating apparatus is operable to provide a signal to a power converter coupled to a photovoltaic device, and wherein the power converter is operable to regulate an output power of a photovoltaic device.

In an embodiment of the second aspect, the electrical power regulating apparatus is implemented in a digital signal processor (DSP).

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

The inventors have, through their own research, trials and experiments, devised that, there are several ways to utilize the energy generated by solar array. The energy generated by solar array can either inject into the utility grid (On-grid application) or stored into battery for later utilization. The most essential parts include: a Solar Array, a Power Conditioning Unit, and a Load/Grid/Battery.

A solar cell is the basic composition element of a solar module. Fundamentally, the solar cell is a PN-junction with large surface area.

The electrical solar cell model consists of a current source. The current source delivers the photocurrent, $I_{ph}$. The quantity of $I_{ph}$ is proportional to the irradiance G of incident light. When the photons strike to the p-doped semiconductor of the solar cell, the electrons are excited and then escaped from p-doped semiconductor to n-doped semiconductor, hence producing photocurrent. Besides, the temperature of the solar cell T will also affect the quantity of $I_{ph}$. However, the impact on the $I_{ph}$ induced by the variation of T is much less significant than the variation of G.

The linear elements, $R_{sh}$ and $R_s$ are the parasitic resistance of the solar cell. Normally, the magnitude of shunt resistance $R_{sh}$ is much larger than the magnitude of series resistance $R_s$. And the current flowing through the series $R_s$ is the output current of the solar cell, $I_{pv}$. There is also a shunt diode exist in the model. $I_d$ is the current flowing through the shunt diode, and the diode is modeled by Schottky diode equation:

$$I_d = I_o(e^{(V_d/nV_t)} - 1) \qquad (1)$$

$I_o$: Reverse saturation current of diode $V_d$: The voltage across diode n: Ideality factor of diode $V_t$: Thermal voltage of diode The value of the voltage across diode $V_d$ is equal to the voltage across the series resistance $R_s$ plus the output voltage of the solar cell $V_{pv}$. Hence, the overall equation descripting a solar cell is, $$I_{pv} = I_{ph} - I_o\left(e^{\left(\frac{V_{pv}+I_{pv}R_s}{nV_t}\right)} - 1\right) - \frac{V_{pv}+I_{pv}R_s}{R_{sh}} \qquad (2)$$

Figure 1:
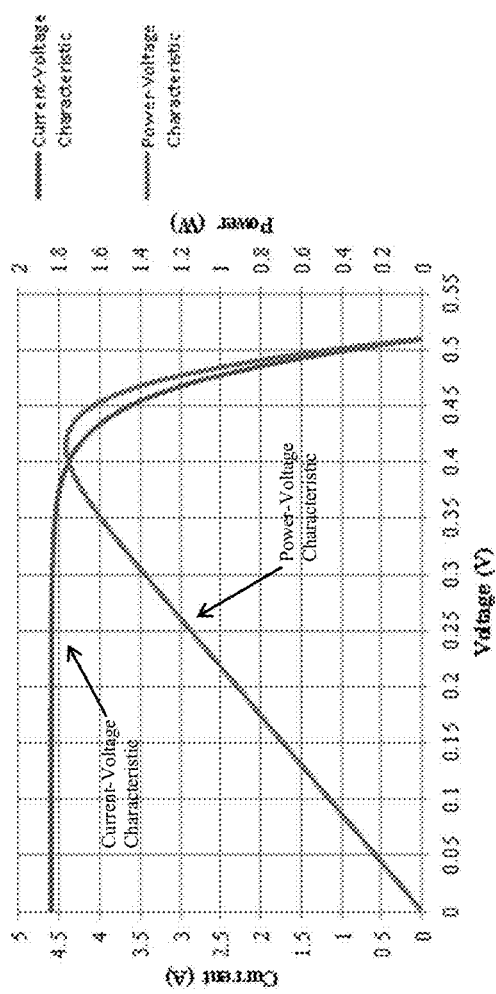
FIG. 1 is a plot diagram showing example characteristics of a solar cell.

Due to the existence of the shunt diode, there is a non-linear relationship between the output current and the output voltage of the solar cell. In an example of embodiment of a solar cell characteristic is illustrated in FIG. 1. In the example, $P_{MPP}$: 1.77 W, $I_{MPP}$: 4.26 A, $V_{MPP}$: 0.415V in Standard Test Condition (STC), where MPP is the point where maximum power point in located on the plot. Under STC, the incident solar irradiance level G is 1000 W/m², and the operating temperature is 25° C. and under Air Mass 1.5 spectral distribution.

Typically, the characteristic of a solar cell is affected by two environmental factors. One of them is the solar irradiance. The remaining factor is operating temperature of solar cell.

Figure 2:
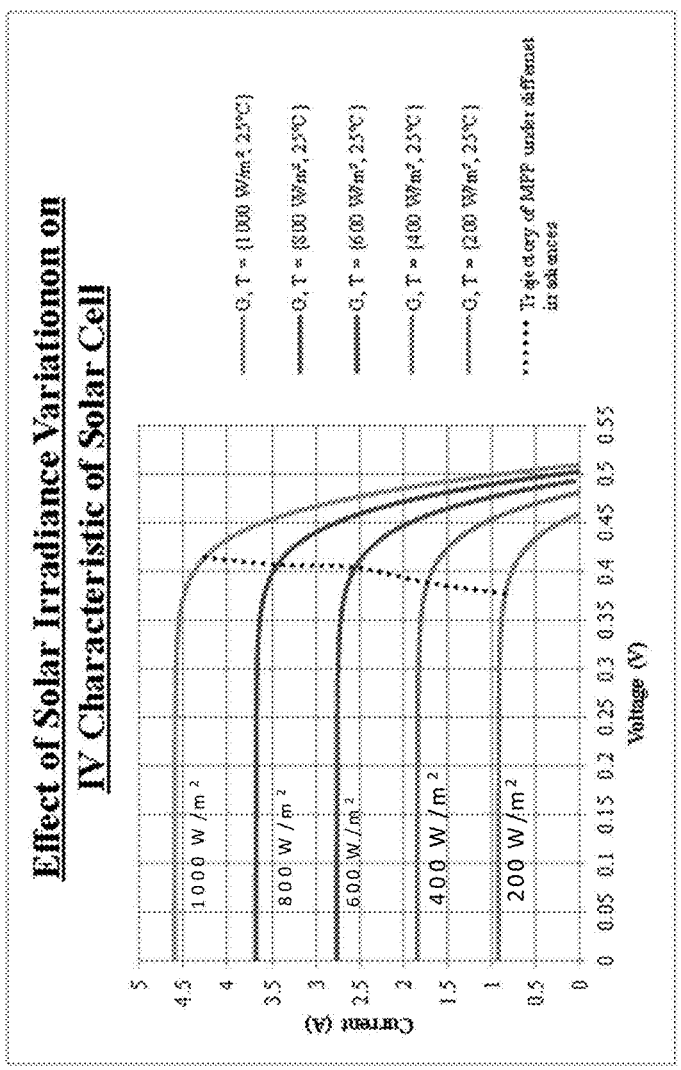
FIG. 2 is a plot diagram showing the effect of solar irradiance variation on the current-voltage characteristics of a solar cell.

As mentioned before, the quantity of photocurrent of solar cell is proportional to solar irradiance. Therefore a noticeable change of $I_{SC}$, the short-circuit current can be observed. Moreover, the variation of solar irradiance will drift the maximum power point. FIG. 2 shows the characteristic of solar cell is changed due to solar irradiance variation.

Since the position of maximum power point is subject to change due to environmental factors, as illustrated in FIG. 2, and these environmental factors can be change suddenly and unpredictably. To completely utilize the energy generated by photovoltaic cell, the unit which interfacing to the solar cells should guide the operating point toward maximum power point. Without this feature, the performance of power generation will be degraded. Additionally, the device should be able to track the maximum power point dynamically when the IV profile of solar cell was changed due to the change of environmental factors.

Solar cells are connected in series and parallel to increase both voltage and current output, hence forming a solar panel. Assuming all solar cells receive identical amount of solar energy, and they have the same physical parameters. The above configuration is equivalent to following electrical model.

$$I_{pv} = N_p I_{ph} - N_p I_o\left(e^{\left(\frac{V_{pv}+I_{pv}R_s\frac{N_s}{N_p}}{N_s n V_t}\right)} - 1\right) - \frac{V_{pv}+I_{pv}R_s\frac{N_s}{N_p}}{R_{sh}\frac{N_s}{N_p}} \qquad (3)$$

$N_p$: Number of Parallel Connected Cell $N_s$: Number of Series Connected Cell

By redefine the parameters, $$I'_{ph} = N_p I_{ph}$$

$$I'_o = N_p I_o$$

$$n' = N_s n$$

$$R'_s = R_s \frac{N_s}{N_p}$$

$$R'_{sh} = R_{sh} \frac{N_s}{N_p}$$

the equation (3) can be rewrite as $$I_{pv} = I'_{ph} - I'_o\left(e^{\left(\frac{V_{pv}+I_{pv}R'_s}{n'V_t}\right)} - 1\right) - \frac{V_{pv}+I_{pv}R'_s}{R'_{sh}} \qquad (4)$$

In some embodiments, multiple photovoltaic (PV) panels are connected to generate adequate power for residential grid-tie solar system, PV panels are connected to form PV array with string configuration.

Figure 3A:
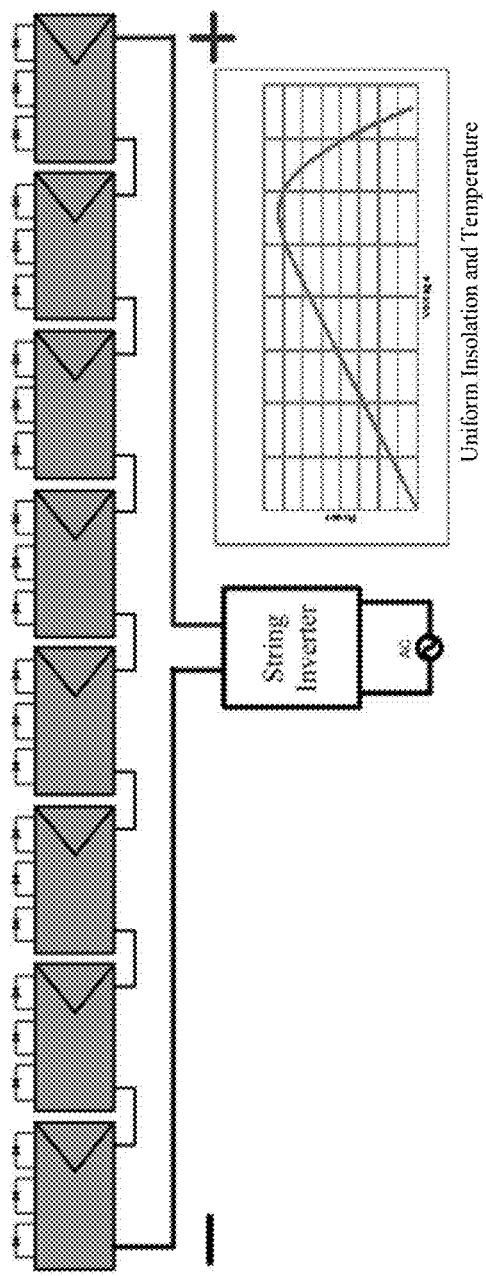
FIG. 3A is a diagram showing multiple solar panels in string configuration under uniform insolation across the solar panels.

The maximum power point of PV array will be affected by solar insolation and temperature. As shown in FIG. 3A, assuming the physical parameters of each solar panel are the same, if the amounts of solar radiation incident to solar panels are identical, and the temperatures of PV panels are the same, there will have only one maximum power point.

Figure 3B:
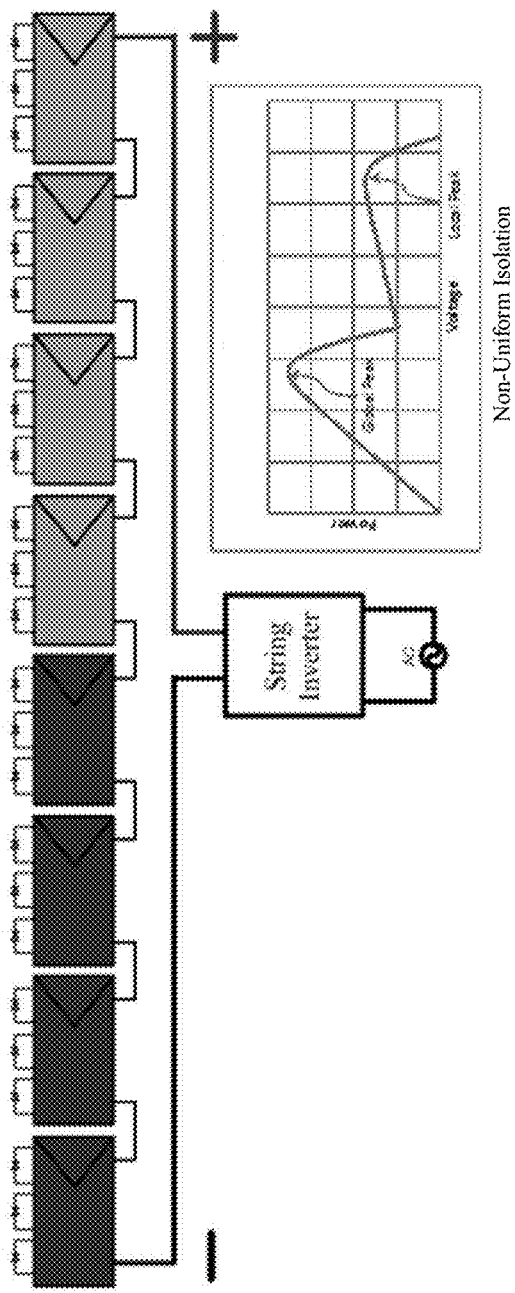
FIG. 3B is a diagram showing multiple solar panels in string configuration under non-uniform insolation across the solar panels.

In some occasions, uniform insolation may not be achievable due to partial shading by surrounding object(s). As a result, as shown in FIG. 3B, the output characteristic of PV array possibly shows multiple power peak(s). In one example embodiment, PV inverters may use "Perturb and Observe" MPPT method which can only able to track single power peak, these inverters will not be able to facing this kind of scenario and may not be able to track global maximum power point. If the power difference between global peak and local peaks are large, large amount energy will be wasted and degrading the performance of inverter.

In order to extract the maximum power from photovoltaic panels, a power converter interface should be placed between the panels and the load. The role of this power converter interface is to provide a physical layer such that the operating point of solar panels can be controlled. On the top of this physical layer, a MPPT method is used to determine the position of the maximum power point and command the power converter adjust the operating point accordingly.

In one example embodiment, the way to track the peak power point is called "Perturb and Observe" (P&O) method to examine the slope of power-voltage curve. A positive slope means the peak power point is located at the right of present operating point and hence the MPPT should issue a voltage reference to the controller of DC/DC converter that will increase the terminal voltage of the converter. And hence the operating point is being shifted toward open-circuit voltage. Similarly, a negative slope means the peak power point is located at the left of present operating point. The MPPT should issue a voltage reference to the controller of DC/DC converter. Afterward, the terminal voltage of the converter will be decreased. The operating point is being shifted toward short-circuit current. Hence, "Perturb and Observe" method perturbs the terminal voltage, and then observing the sign of the slope of power-voltage curve, and the decision is made by above control law. By repeating this process, the operating point of the DC/DC converter will converge to peak power point, the energy extracted from solar cell is maximized.

P&O method is easy to implement in digital controller. However, one of the concerns about of this method is the speed of convergence. If the step size of each perturbation is small, the speed of convergence will be slow. However, if the step size of each perturbation is too large, the operating point of the converter will oscillate around the maximum power point and cannot extract maximum power from the panel. Moreover, this method is a local optimization method. If multiple peaks exist in the search space, P&O method will trapped in local optimum point.

In another example embodiment, Extremum Seeking Control (ESC) method is a kind of adaptive control method. A sinusoidal modulating signal is superimposed with the voltage reference causing the PV Panels are being perturbed and hence power oscillation can be observed. The magnitude of power oscillation determines the step size of voltage reference. And the phase difference between power oscillation and voltage reference oscillation determine the sign of voltage step size.

However the proposed control is not applicable for string inverter if global searching capability is required. The ESC method handle the panel mismatch by using topological approach. Each panel interfaces with one DC/DC Converter. The system cost will be higher than string inverter configuration. Moreover, even there is one panel, partial shading can still occur because several bypass diodes can be exist in a solar panel.

To extend the capability of ESC, by introducing global search scheme, the Sequential ESC-Based Global MPPT Control makes use of turning point current to predict the shading factor which is describing the shading level of each panel. This method then sweeps the voltage selectively by using ESC to acquire the profile and hence determine the global maximum point. However the drawback is that the electrical parameters of PV array are required.

In another example embodiment, Incremental conductance method is used and is similar to P&O method which is hill climbing algorithm. For each perturbation, the incremental conductance of the input compared with the conductance of the input. The step-size may be variable, but it is only able to track the local maximum power point.

To extend the global search capability of incremental conductance, a linear function may be used to track the global maximum power point. However, the string configuration, such as the number of parallel-connected PV strings is required for this method.

In one example embodiment, an MPPT method is based on Particle Swarm Optimization (PSO). The significance of the method is to reduce the number of sensors used in the dual input string PV system without sacrificing global search capability.

The nature of PSO is agent-based. To ensure the global search capability, the number of agents cannot be too small. However if the number of agent is high, a large oscillation is unavoidable when the agents of PSO MPPT examining the objective function.

The feasibility of such method in string inverter with high voltage input scenario is doubtful because large input oscillation can be induced if any two agents in search space are far apart.

In another embodiment, the method of using charging transient obtains the current-voltage characteristic during the input capacitor is charging up by PV Panels.

However, the biggest drawback is that before charging phase, the input capacitor of the inverter is needed to be fully discharge such that the voltage becomes zero. Then the generation of AC is interrupted during searching.

Moreover, the current-voltage characteristic obtained by charging is affected by capacitive effect. In fact, there is a parasitic capacitance exists in solar cell. Deviation can be expected between dynamic and static current-voltage characteristics. Detection of MPP shall be made based on static current-voltage characteristic rather than dynamic characteristic.

Figure 4:
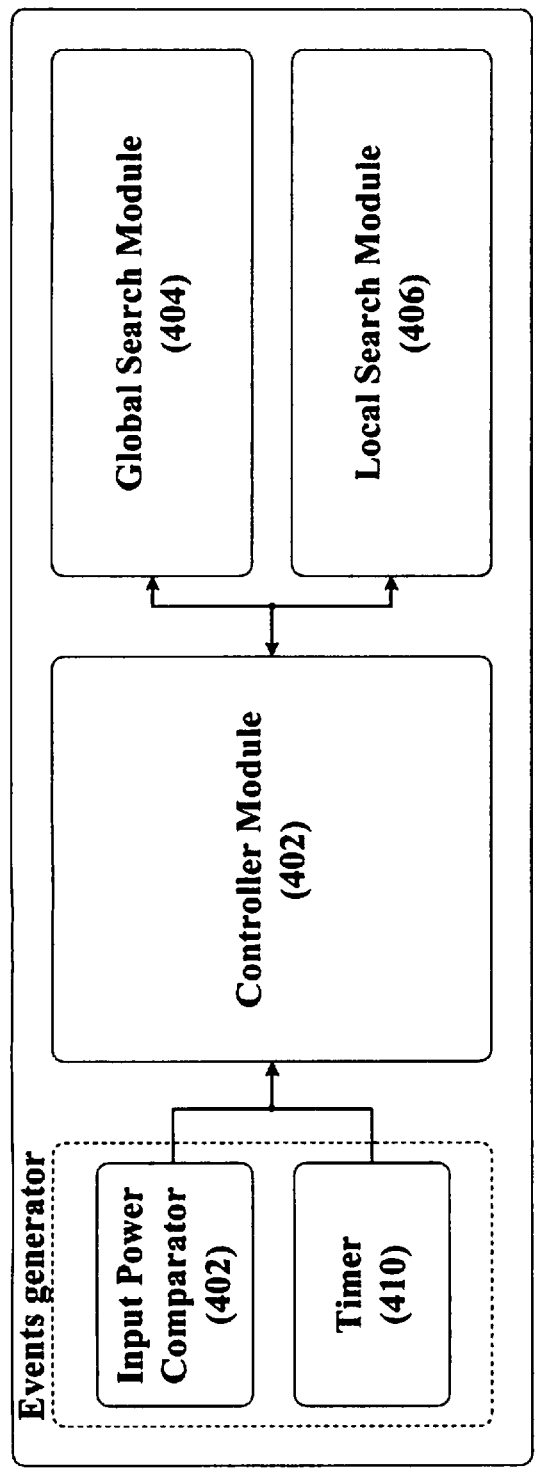
FIG. 4 is a block diagram of an electrical power source regulator in accordance with one embodiment of the present invention.

Referring to FIG. 4, there is shown an electrical power regulating apparatus 400 comprising: a controller module 402 arranged to detect for one or more predetermined conditions associated with the load power of the electrical power source; a global maximum search module 404 arranged to acquire electrical characteristics of the electrical power source to determine a global maximum load power value arranged to represent a true maximum load power of the electrical power source whereupon the one or more predetermined conditions is detected; and a local maximum search module 406 arranged to process the global maximum load power value to determine a local maximum load power value of the electrical power source; wherein the local maximum load power value is arranged to be more accurate in representing the true maximum load power of the electrical power source when compared with the global maximum load power value.

In a preferred embodiment, the true maximum load power is defined as a maximum available power delivered to an electrical load in association with the electrical power source within a range of operation voltage of the electrical power source operating in an operation condition.

Preferably, the one or more predetermined conditions include a predetermined variation in the load power of the electrical power source at an operating voltage, which is detectable by an Input Power Comparator 408 as shown in FIG. 4. Alternatively or additionally, the one or more predetermined conditions include reaching a time interval that the electrical power sources has been operating which is detectable by a timer 410. Preferably, the Input power Comparator 408 and the timer 410 is included in an event generator. The events generator will transmit a signal to the controller module 402 if the power level is significantly lower than previous power level, or the local search module is already executed for a period of time.

Preferably, these predetermined events that will trigger a condition that a global maximum load power value searching should be determined. The controller module 402 is used to detect these events, and invokes global search module 404 accordingly. Once the execution of global search module 404 is done, the controller module will invoke local search module 406 to process the global maximum load power value determined by the global search module 404, and refine the searching result to a local maximum load power value. In other word, this controller module acts like a dispatcher and controlling the execution of local search and global search method.

Optionally, since the CPU time spent on of global search module is higher than that of local search module, it is not worth performing global search continuously.

Figure 5:
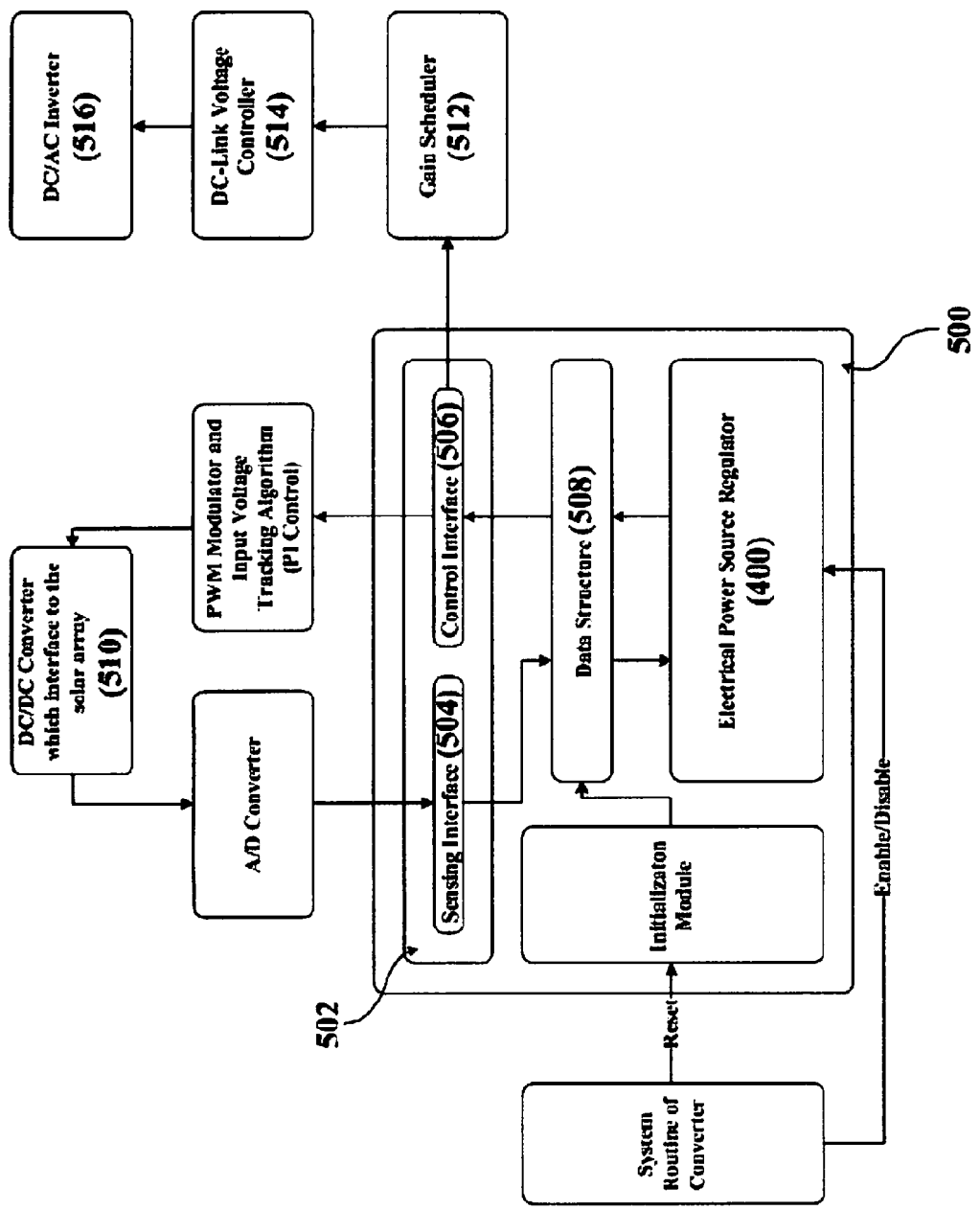
FIG. 5 is a block diagram of an electrical power source regulator in accordance with another embodiment of the present invention.

With reference to FIG. 5, there is shown an embodiment of an electrical power regulating apparatus 500 comprising: an electrical power regulating apparatus 400, a data structure 508, a sensing interface 504 and a control interface 506 and an initialization module.

Preferably, the sensing interface 504 remap an incoming signal to a data structure 508 for the processing the global maximum load power value and/or the local maximum load power value, and the control interface 506 assigns the input voltage reference to an input voltage controller for varying the load power of the power source. Optionally, the sensing interface 504 and the control interface 506 may be implemented as a Hardware Abstraction Layer (HAL) 502. All the functions inside the electrical power regulating apparatus 400 access the input voltage or input current value in the data structure instead of directly accessing the registers of A/D converter coupled to the DC/DC converter 510.

Preferably, since the DC/DC converter 510 is responsible for regulating the input voltage of the power source instead of output voltage, and the electrical power source regulator 400 establishes a relatively fast input transition in global searching. The response of DC-Link voltage controller 514 may not fast enough and trigger the protection due to the overvoltage or undervoltage fault of DC-Link. Therefore a gain scheduling approach is used to solve this problem.

Preferably, a gain scheduler arranged to control one or more gain parameters of a DC-bus (DC-Link) voltage controller 514, wherein the DC-bus voltage controller 514 is operable to control the load power of the electrical power source. Preferably, there may be 4 gain profiles predefined inside the gain scheduler 512, named "Steady", "Medium", "Fast" and "Ultra". Alternatively, any number of profiles may be defined in the gain scheduler 512, wherein the gain scheduler is arranged to adjust a gain according to the profile selected depending on one or more states associated with the step of determining the global maximum load power value. Depends on the scenario, the electrical power source regulating apparatus 500 will request the gain scheduler 512 to adjust the profile according to the requirement. Preferably, the request should be issued through control interface 506.

Figure 6:
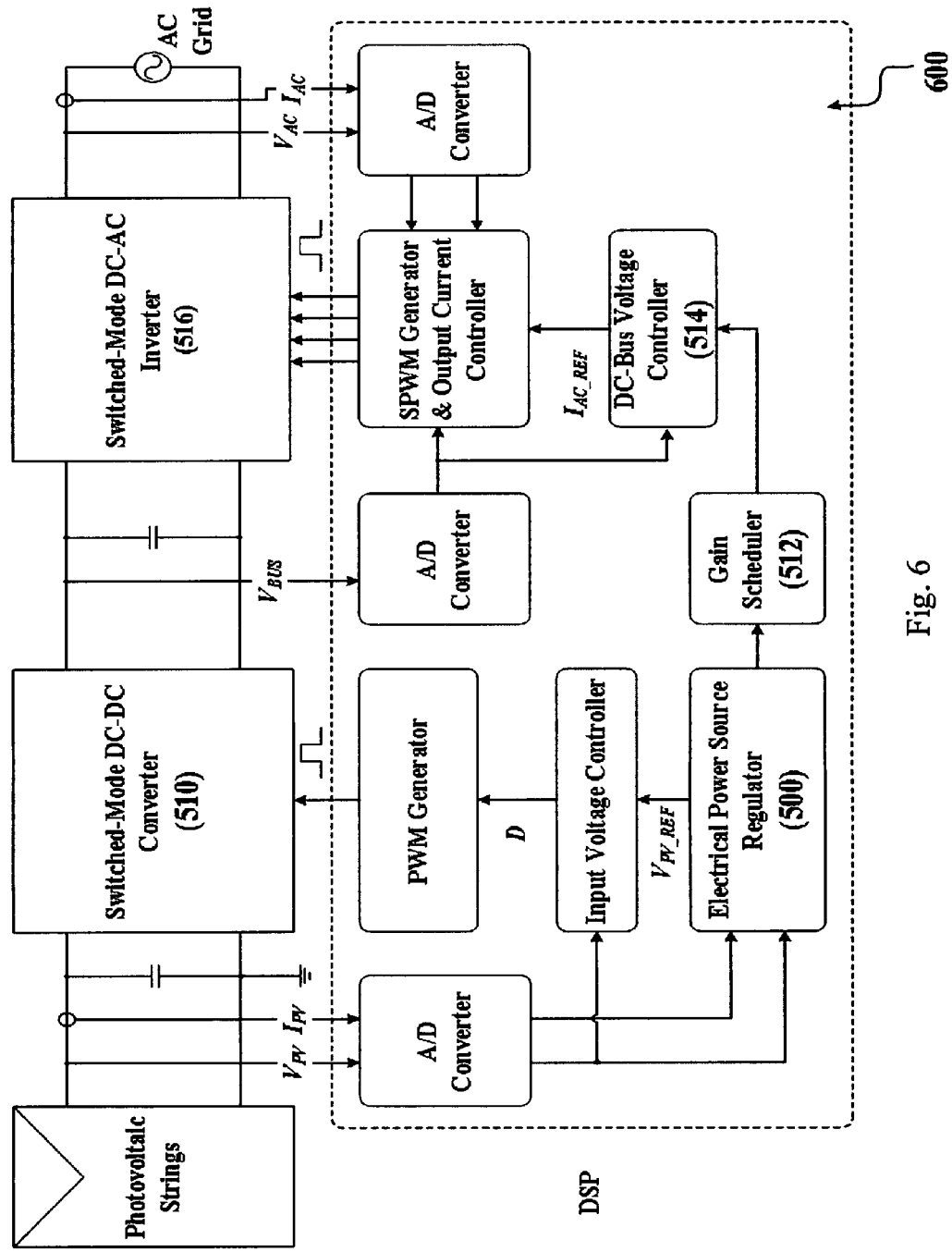
FIG. 6 is a block diagram of an electrical power source regulator in accordance with another embodiment of the present invention, and the electrical power source regulator is associated with an electrical power source and an electrical load.

With reference to FIG. 6, there is shown an embodiment of an electrical power regulating apparatus 600 comprising: an electrical power regulating apparatus 500, a gain scheduler 512, a DC-Bus Voltage Controller 514, a plurality of A/D converter, a PWM Generator, an Input Voltage Controller, an SPWM generator and out put current controller. The electrical power regulating apparatus 600 may obtain input signals from the power source, the power converter including a switch-mode DC-DC converter 510 and a switched-mode DC-AC inverter, and the AC Grid. In this embodiment, the power source is a photovoltaic string. Alternatively, the power source is any type of power source operable to generate an electrical power.

Preferably, the electrical power regulating apparatus 600 is implemented in a digital domain, and the electrical power regulating apparatus 600 is implemented in a digital signal processor (DSP). Alternatively, the electrical power regulating apparatus may be implemented in an analog domain, and the electrical power regulating apparatus is a analog device.

Figure 7:
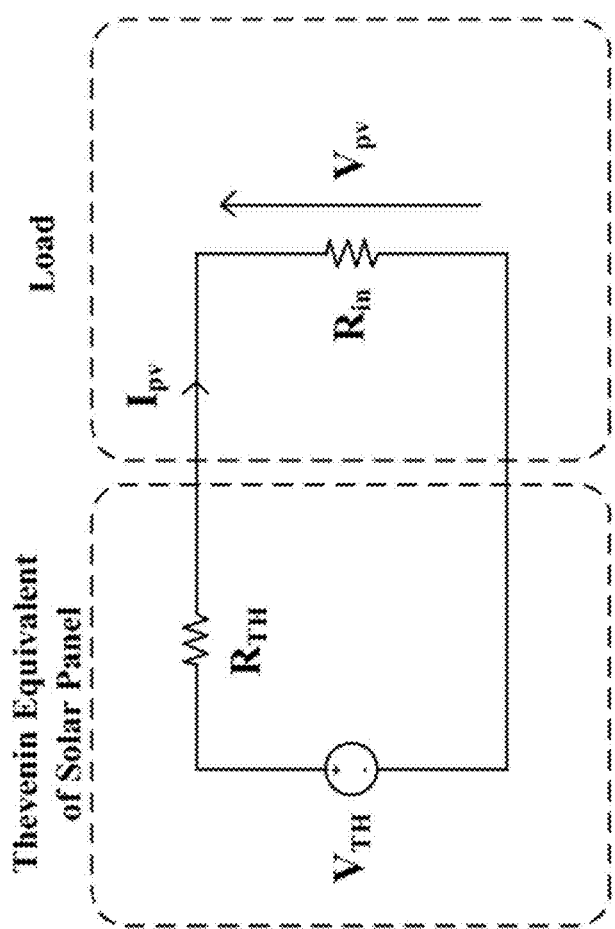
FIG. 7 is a schematic diagram of a Thévenin equivalent circuit of a solar panel in accordance with one embodiment of the present invention.

Referring to FIG. 7, there is shown a Thévenin equivalent circuit of a solar panel in accordance with one embodiment of the present invention. In one preferred embodiment, the local maximum load power value is determined by providing a plurality of parameters of a current-voltage characteristic associated to a Thévenin equivalent circuit of the power source.

Preferably, the method for regulating an electrical power source comprising the steps of: processing the parameters of the current-voltage characteristic associated to the Thévenin equivalent circuit of the power source; and determining if a condition for the local maximum load power value is reached.

Consider the input resistance of the load is $R_{in}$, the voltage across the load is, $$V_{pv} = V_{TH} \times \frac{R_{in}}{R_{in} + R_{TH}} \qquad (5)$$

By taking partial derivative on equation (5) with respect to $R_{in}$, $$\frac{\partial V_{pv}}{\partial R_{in}} = V_{TH} \left[ \frac{R_{TH}}{(R_{in} + R_{TH})^2} \right] \qquad (6)$$

Consider the power dissipated in $R_{IN}$, $$P_{in} = (V_{TH})^2 \left[ \frac{R_{TH}}{(R_{in} + R_{TH})^2} \right] \qquad (7)$$

Hence the Thévenin resistance $R_{TH}$, $$R_{TH} = \frac{\partial V_{pv}}{\partial R_{in}} \times \left[ R_{in} \left( I_{pv} - \frac{\partial V_{in}}{\partial R_{in}} \right)^{-1} \right] \qquad (8)$$

Rearrange the above equation gives, $$\frac{R_{TH}}{R_{in}} = \frac{\partial V_{pv}}{\partial R_{in}} \times \left( I_{pv} - \frac{\partial V_{in}}{\partial R_{in}} \right)^{-1} \qquad (9)$$

Then the ratio between Thévenin resistance and load resistance indicating whether the maximum power point is reached. Recall the maximum power transfer theorem, in order to extract the maximum power from the source $V_{TH}$, the resistance of the load $R_{in}$ must be equal to the internal resistance $R_{TH}$, therefore, $$\frac{\partial V_{pv}}{\partial R_{in}} \times \left( I_{pv} - \frac{\partial V_{in}}{\partial R_{in}} \right)^{-1} = 1$$

$$I_{in} = 2 \frac{\partial V_{pv}}{\partial R_{in}}$$

The above equation indicating if the quantity of input current is equal to the two times of first partial derivative of input voltage with respect to input resistance, then the maximum power point is reached locally.

Consider an ideal solar cell model with no parasitic resistance, by equation (2), $$I_{pv} = I_{ph} - I_o \left( e^{\left( \frac{V_{pv}}{nV_t} \right)} - 1 \right) \qquad (10)$$

Then the current of shunt diode can be treated as a function of $V_{pv}$ $$I_d = f(V_{pv}) = I_o \left( e^{\left( \frac{V_{pv}}{nV_t} \right)} - 1 \right) \qquad (11)$$

Differentiate equation (10) with respect to $R_{IN}$ gives, $$\frac{1}{R_{in}}\left(\frac{\partial V_{in}}{\partial R_{in}} - \frac{V_{in}}{R_{in}}\right) = -f'(V_{pv}) \quad (12)$$

$$\frac{\partial V_{in}}{\partial R_{in}} = \frac{I_{pv} \times nV_t}{nV_t + R_{in} \times f(V_{pv})}$$

Then by using equation (12), the relationship between Thévenin resistance and the terms in the nonlinear model can be formulated.

$$\frac{R_{TH}}{R_{in}} = \frac{I_{pv}nV_t}{nV_t + R_{in}f(V_{pv})} \times \frac{nV_t + R_{in}f(V_{pv})}{V_{pv}f(V_{pv})} \quad (13)$$

$$\frac{R_{TH}}{R_{in}} = \frac{I_{pv}nV_t}{V_{pv}f(V_{pv})}$$

$$R_{TH} = R_{in}\frac{I_{pv}nV_t}{V_{pv}f(V_{pv})}$$

$$R_{TH} = \frac{nV_t}{f(V_{pv})}$$

Since the term $V_t$ is a function of temperature.
q: Magnitude of charge on an electron
k: Boltzmann constant
T: Absolute temperature of PN Junction in solar cell
$V_t$: Thermal voltage of diode $$V_t = g(T) = \frac{kT}{q} \quad (14)$$

By (13) and (14), yields, $$R_{TH} = r(T, V_{pv}) = \frac{g(T)}{f(V_{pv})} \quad (15)$$

According to equation (15), the internal resistance $R_{TH}$ is a function of $V_{pv}$ and temperature T. Assuming the variation of g(T) is negligible, the value of $R_{TH}$ will largely depends on the operating voltage $V_{pv}$. The value of $R_{TH}$ will change if terminal voltage $V_{pv}$ changed respectively.

Consider the solar panel is nearly open-circuited, $$R_{in} \to \infty \quad (16)$$

$$V_{pv} \to V_{oc}$$

$$R_{TH} = r(T, V_{pv}) \to \min\{R_{TH}\}$$

$$R_{in} > R_{TH}$$

$$\therefore \frac{R_{TH}}{R_{in}} < 1$$

Recall equation (9), $$\frac{\partial V_{pv}}{\partial R_{in}} \times \left(I_{pv} - \frac{\partial V_{in}}{\partial R_{in}}\right)^{-1} < 1 \quad (17)$$

$$I_{in} > 2\frac{\partial V_{pv}}{\partial R_{in}}$$

The above condition exploits the fact that if given the magnitude of current is greater than the two times of first partial derivative of input voltage with respect to input resistance, this operating point is not regarded as maximum power point, and the corresponding local maximum power point should be located at the left of this operating point. MPPT should decrease its voltage reference of the converter in order to track the maximum power point.

Consider the solar panel is nearly short-circuited, $$R_{in} \to 0 \quad (18)$$

$$V_{pv} \to 0$$

$$R_{TH} = r(T, V_{pv}) \to \infty$$

$$R_{in} < R_{TH}$$

$$\therefore \frac{R_{TH}}{R_{in}} > 1$$

Recall equation (9), $$\frac{\partial V_{pv}}{\partial R_{in}} \times \left(I_{pv} - \frac{\partial V_{in}}{\partial R_{in}}\right)^{-1} > 1 \quad (19)$$

$$I_{in} < 2\frac{\partial V_{pv}}{\partial R_{in}}$$

The above condition exploits the fact that if given the magnitude of current is smaller than the two times of first partial derivative of input voltage with respect to input resistance, this operating point is not regarded as maximum power point, and the corresponding local maximum power point should be located at the right of this operating point. MPPT should increase its voltage reference of the converter in order to track the maximum power point.

The following table summarize the conditions where maximum power point is located.

TABLE 1

| Method of MPP Detection | |
| --- | --- |
| Conditions | Locations of MPP |
| $I_{in} > 2\frac{\partial V_{pv}}{\partial R_{in}}$ | MPP is located at the left of Operating Point |
| $I_{in} = 2\frac{\partial V_{pv}}{\partial R_{in}}$ | MPP is located |
| $I_{in} < 2\frac{\partial V_{pv}}{\partial R_{in}}$ | MPP is located at the right of Operating Point |

Preferably, the algorithm is implemented in digital domain, the method should be discretized to facilitate the calculation of digital processor, such as a digital signal processor (DSP). By using finite difference approximations on equation 8, $$R_{TH}[n] = \frac{\Delta V_{in}[n]}{\Delta R_{in}[n]} R_{in}[n] \left(I_{in}[n] - \frac{\Delta V_{in}[n]}{\Delta R_{in}[n]}\right)^{-1} \quad (20)$$

Where, $$\Delta V_{in}[n] = V_{in}[n] - V_{in}[n-1]$$

-continued $$\Delta R_{in}[n] = R_{in}[n] - R_{in}[n-1] = \frac{V_{in}[n]}{I_{in}[n]} - \frac{V_{in}[n-1]}{I_{in}[n-1]}$$

Theoretically, the MPP is reached if $$I_{in} - 2_{\partial R_{in}}{}^{\partial V_{pv}}$$

in some example embodiments, the finite difference approximation is used, a difference quotient is get, $$I_{in}[n] = 2\frac{\Delta V_{in}[n]}{\Delta R_{in}[n]}$$

Due to several types of noise exist as well as the error introduced by finite difference method, even the MPP is reached, the magnitude of right hand side is rarely equals to the left hand side. Alternatively, a threshold value is provided to arranged to allow a predetermined tolerance in determining if the condition for the local maximum load power value is reached, $$\left| I_{in}[n] - 2\frac{\Delta V_{in}[n]}{\Delta R_{in}[n]} \right| \leq I_{in}[n] \times E_{threshold}$$

The value of $E_{threshold}$ is set to 1.56% in some embodiments. If the magnitude of left hand side is smaller than right hand side in above equation, the operating point is regarded as local maximum power point.

Figure 9:
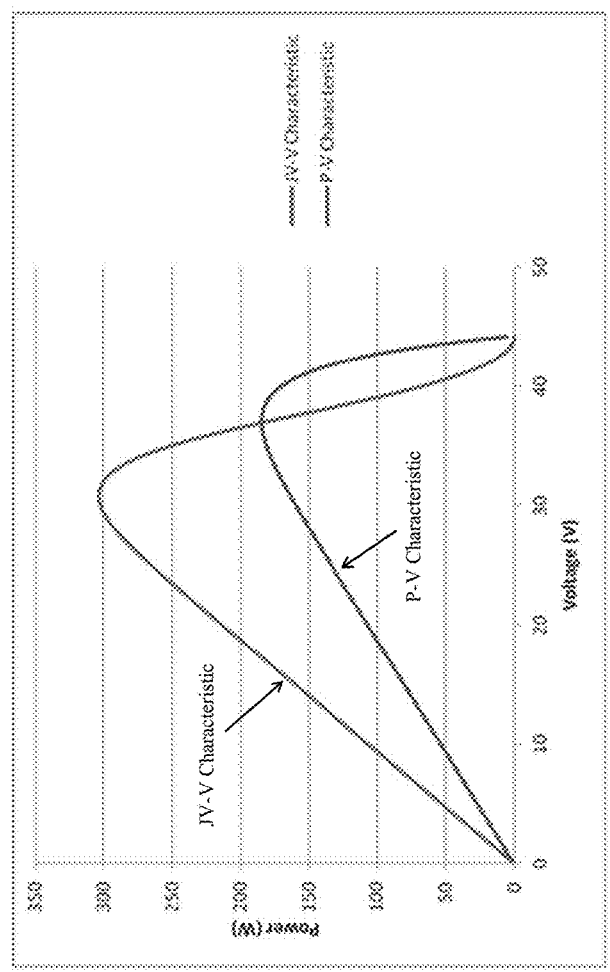
FIG. 9 is a plot diagram showing the power-voltage characteristics of a solar panel.

Preferably, in the MPPT method that making use of Thévenin equivalent circuit.
Refers to the FIG. 9, the term $$2\frac{\partial V_{pv}}{\partial R_{in}}$$

can be directly compare with $I_{in}$ in V-I plane. If $$2\frac{\partial V_{pv}}{\partial R_{in}}$$

is treated as a virtual current point, and discretize it, $$J[n] = 2\frac{\Delta V_{in}[n]}{\Delta R_{in}[n]}$$

and let this virtual current point as J[n].
By multiplying J[n] with $V_{in}[n]$, then the product can be regarded as a virtual power point, and this point can be compare with $P_{in}[n]$ in V-P plane.

$$P_{virtual}[n] = V_{in}[n]J[n]$$

Preferably, an accuracy and/or a speed of the determination of local maximum load power value is increased by transforming the current-voltage characteristic to a quadratic profile associated with the current-voltage characteristic around the local maximum load power value. It is possible to form a quadratic equation to describe the P-V curve by using three set of $\{V_{in}, P_{in}\}$ points.

Similarly, the curve of JV-V characteristic is also looks like a parabola near maximum power point region. Another quadratic equation can be formulated by acquiring three set of $\{V_{in}, P_{virtual}\}$ points.

Alternatively, the quadratic profile is obtained by three or more data points associated with the current-voltage characteristic.

Preferably, there is two quadratic equations formulated:

$$\begin{cases} y_a(P_{in}) = A_a(V_{in})^2 + B_a(V_{in}) + C_a \\ y_b(P_{virtual}) = A_b(V_{in})^2 + B_b(V_{in}) + C_b \end{cases}$$

Figure 10A:
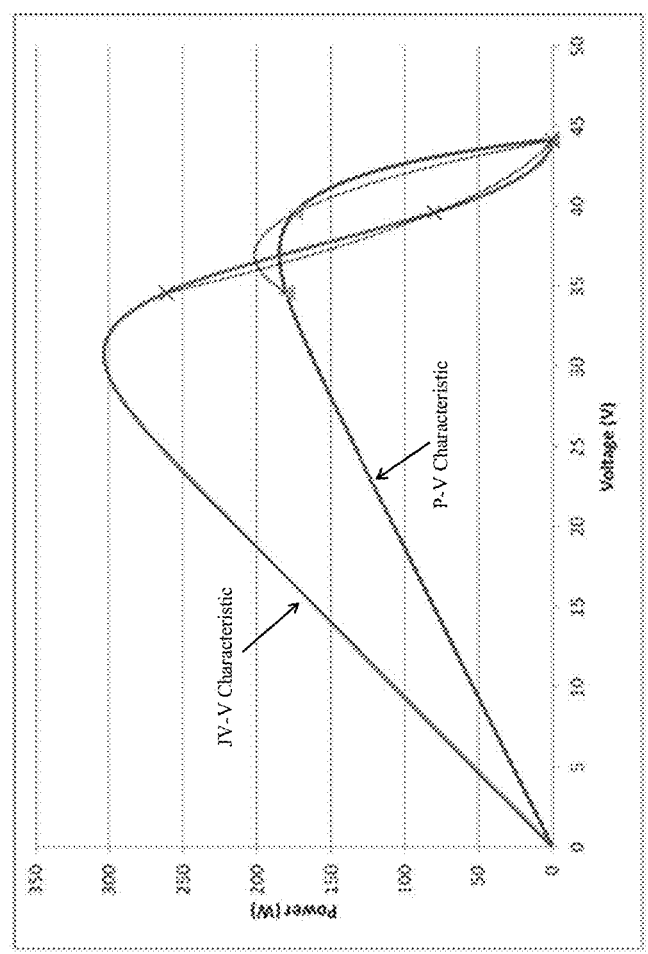
FIG. 10A is a plot diagram showing the power-voltage characteristics of a solar in accordance with FIG. 9 and an illustration of providing a prediction of local maximum load power value by the interpolation method.

Preferably, the function $y_a(P_{in})$ can be solved with $y_a(P_{virtual})$ to find the interception points. Hence, as shown in FIG. 10A, if the interception point is bounded in the region of given three $\{V_{in}, P_{in}\}$ points, and three $\{V_{in}, P_{virtual}\}$ points (interpolation), then MPPT will output this interception point as new reference input voltage. And hence the accuracy of MPP detection can be increased since this action equivalent to employing a dynamic (smaller) step size than nominal fixed step size, which results in better accuracy or better speed of the method.

Figure 10B:
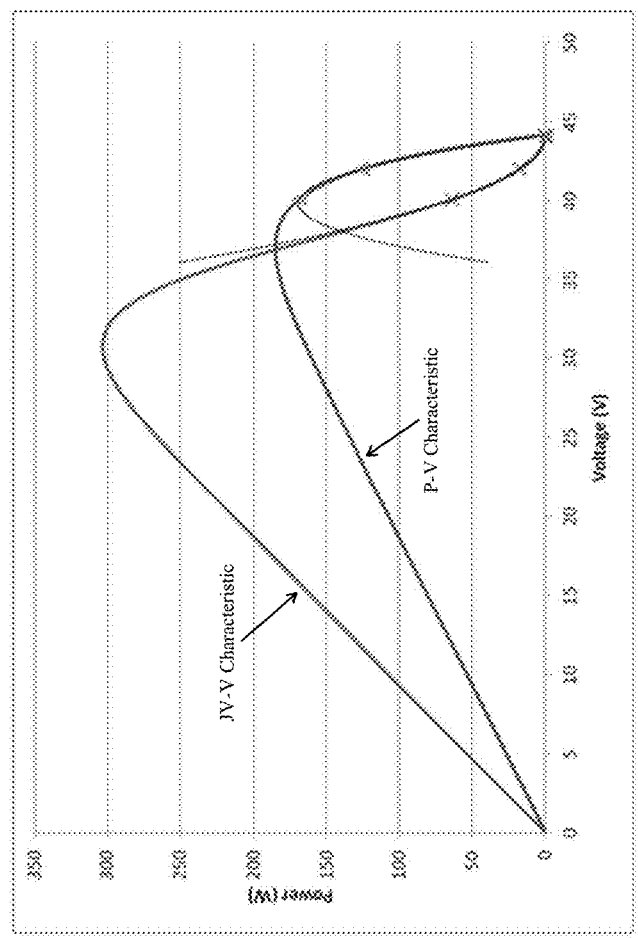
FIG. 10B is a plot diagram showing the power-voltage characteristics of a solar in accordance with FIG. 9 and an illustration of providing a prediction of local maximum load power value by the extrapolation method.

Alternatively, as shown in FIG. 10B, if the interception point is outside of the region of given three $\{V_{in}, P_{in}\}$ points, and three $\{V_{in}, P_{virtual}\}$ points (extrapolation), then the speed of convergence can be increased because the MPP is predicted with a dynamic (larger) step size instead of perturb the solar panel by using fixed step size.

Preferably, the method will validate the $y_a(P_{in})$ curve since this curve supposed to be open down. The $A_a$ coefficient should be negative. If not, the MPPT will not further calculate the interception points.

Preferably, there can be two interception points exist for two quadratic equations. And hence, some logics are added to determine which interception point is the MPP or near MPP by using following condition, including to Determine which interception points have higher power and to determine whether the power value of that interception point is positive.

Figure 16:
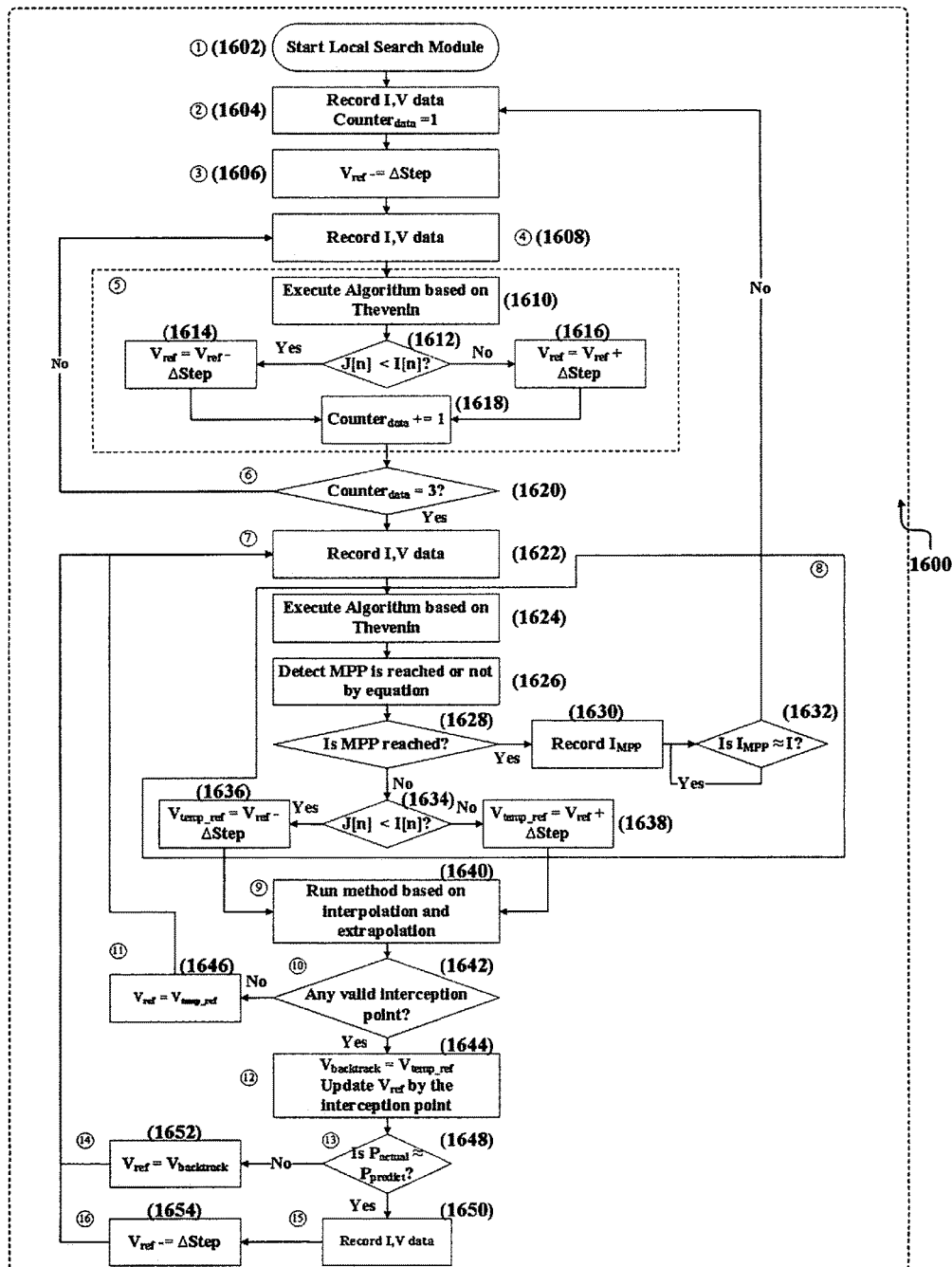
FIG. 16 is a flow diagram of the step of determining a local maximum load power value the method for regulating an electrical power source in accordance with the method of FIG. 14.

Preferably, one of the interception points will be filtered. The remaining interception point will be treated as valid. Before assigning this valid interception point, the voltage reference outputted by Thévenin algorithm will be assigned to another variable for backtracking purpose. Afterward, this voltage reference will be adjusted according to this valid interception point. After proceed the next step, the MPPT will check whether there is a large deviation between the predicted power in previous step and the actual power, if yes, then the MPPT will backtracked to original reference voltage that stored before. In an example embodiment, a detailed flow chart of local search module is shown in FIG. 16, and is explained as follows:

1. The local search module is started.
2. Record the input voltage and input current value. Set the variable $Counter_{data}$ to 1
3. Decrease the input voltage reference
4. Record the input voltage and input current value.
5. Execute the algorithm based on Thévenin circuit.
   a. The algorithm based on Thévenin will generate new variable J for each pair of V,I
   b. The input voltage reference is either decrease or increase based on the comparison between J and I
   c. Increment the variable $Counter_{data}$
6. Check if the $Counter_{data}$ equals to 3.
7. Record the input voltage and input current value.

8. Execute the algorithm based on Thévenin circuit.
   a. The algorithm based on Thévenin will generate new variable J for each pair of V,I
   b. Then the algorithm checks the whether the maximum power point is reached.
      i. If the algorithm realize this operating point is maximum power point, the current value will be assigned to variable $I_{MPP}$
      ii. Continuously check the current value of input terminal, see if any large deviation between it and $I_{MPP}$
   c. If MPP is not reached
      i. Based on the comparison between J and I, the next voltage reference should be increased or decreased can be known. However, this proposed voltage reference will not assign to voltage reference directly. Instead, this value will be assigned to variable $V_{temp\_ref}$
9. Execute the algorithm based on interpolation and extrapolation.
10. Validating interception point.
11. If there is no valid interception point from step 9, use $V_{ref}=V_{temp\_ref}$
12. If there is a valid interception point, the value $V_{temp\_ref}$ will be backup to $V_{backtrack}$ And the $V_{ref}$ will be updated by the valid interception point.
13. Check the actual power of new operating point is approximate equals to the predicted power by the algorithm based on interpolation and extrapolation.
14. If there is large difference between actual power and predicted power, then assign the $V_{ref}$ by $V_{backtrack}$
15. Record the input voltage and input current value.
16. Decrease the input voltage by decrement the voltage reference.

Figure 11:
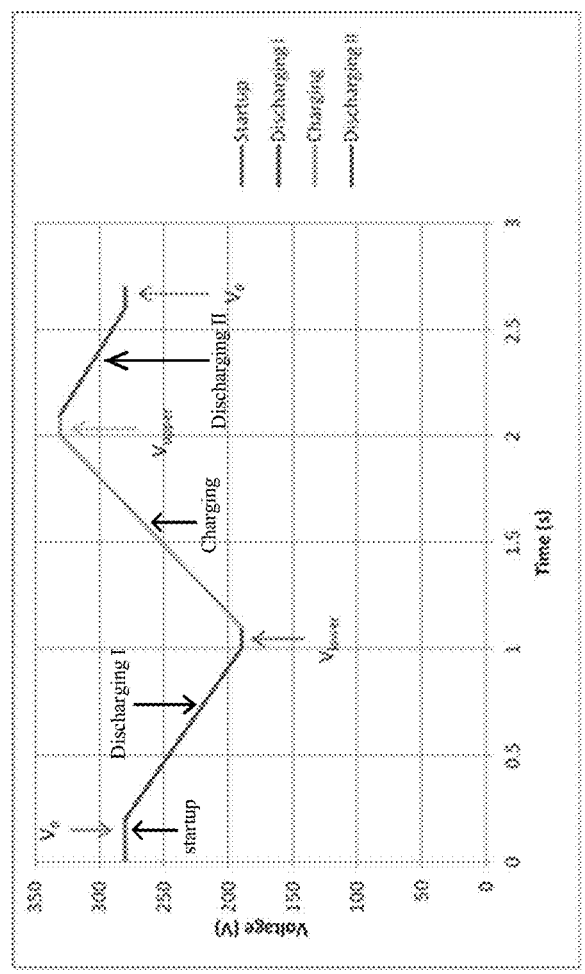
FIG. 11 is a plot diagram showing an example of sweeping and acquiring the input current-voltage characteristic of the electrical power source for determining a global maximum load power value.

With reference to FIG. 11, there is shown a method for regulating an electrical power source, wherein the step of acquiring electrical characteristics of the electrical power source to determine a global maximum load power value further includes sweeping and acquiring of an input current-voltage characteristic of the electrical power source, Preferably, the input current-voltage characteristic acquired is processed for determining the global maximum load power value.

Preferably, the input current-voltage characteristic includes a charging characteristic and a discharging characteristic of the electrical power source. Alternatively, the input current-voltage characteristic may include a charging characteristic or a discharging characteristic only.

In the example embodiment as shown in FIG. 11, to find the global maximum load power value, some parameters are defined.

$V_{lower}$: Defined as lower bound voltage of search space
$V_{upper}$: Defined as upper bound voltage of search space
$V_0$: The voltage level before execute the sweeping At the very beginning, the global search module will record the voltage level $V_0$. Afterward, the input voltage of converter will continuously decrease. At the same time, the global search module will record the V-I characteristic. Once the input voltage is reached the $V_{lower}$ level, the discharging process is ended. Hence the first V-I curve is obtained by using discharging method. Then the input voltage of converter will continuously increase. Similar to the previous method, the global search module will record the V-I characteristic simultaneously. Once the input voltage is reached the $V_{upper}$ level, the charging process is done. Hence the second V-I curve is obtained by using charging method. In this case, $V_{upper}$ is higher than $V_0$, the input voltage of converter will continuously decrease to restore the voltage level $V_0$. The V-I characteristic is also recorded throughout this process. Hence the third V-I curve is obtained.

Alternatively, the voltage sweep process is reversed and the global search module may obtain a charging-discharging-charging input current-voltage characteristic.

Figure 12:
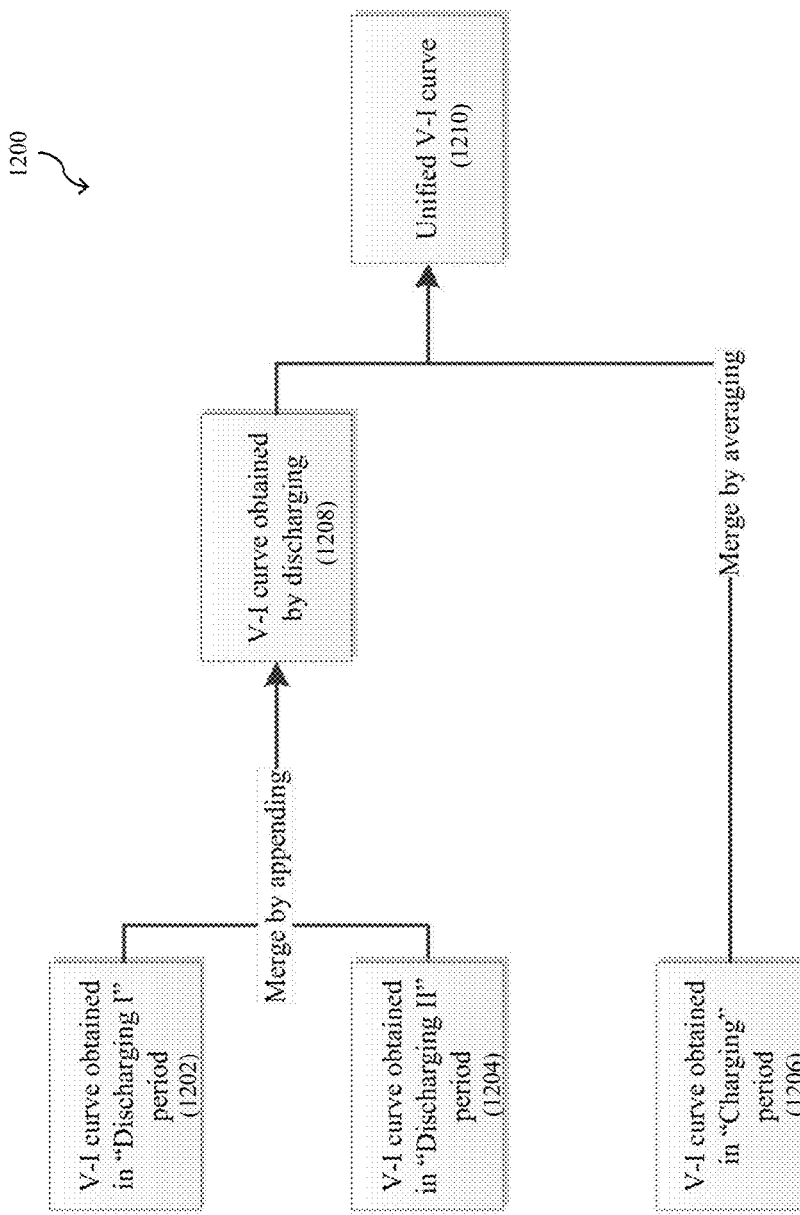
FIG. 12 is a block diagram illustrating an example of generating a unified input current-voltage characteristic of the electrical power source for determining a global maximum load power value.

With reference to FIG. 12, there is shown a method of providing a unified current-voltage profile by: combining the first period and the third period of the input current-voltage characteristic; and averaging the second period of the input current-voltage characteristic with the combined first and third period of the input current-voltage characteristic.

The first V-I curve obtained in "Discharging I" period is merged with "Discharging II" period by appending the series according to voltage. Hence a new V-I curve obtained by discharging process is produced.

In some example embodiments, the noise exists as the sampling rate increases, some errors appear between the new V-I curve and the third V-I curve which is obtained by charging process. Then a unified V-I curve is obtained by merging them with averaging. Preferably, the method of averaging reduces the deviation between these two curves caused by parasitic capacitance inside solar cells.

Figure 15:
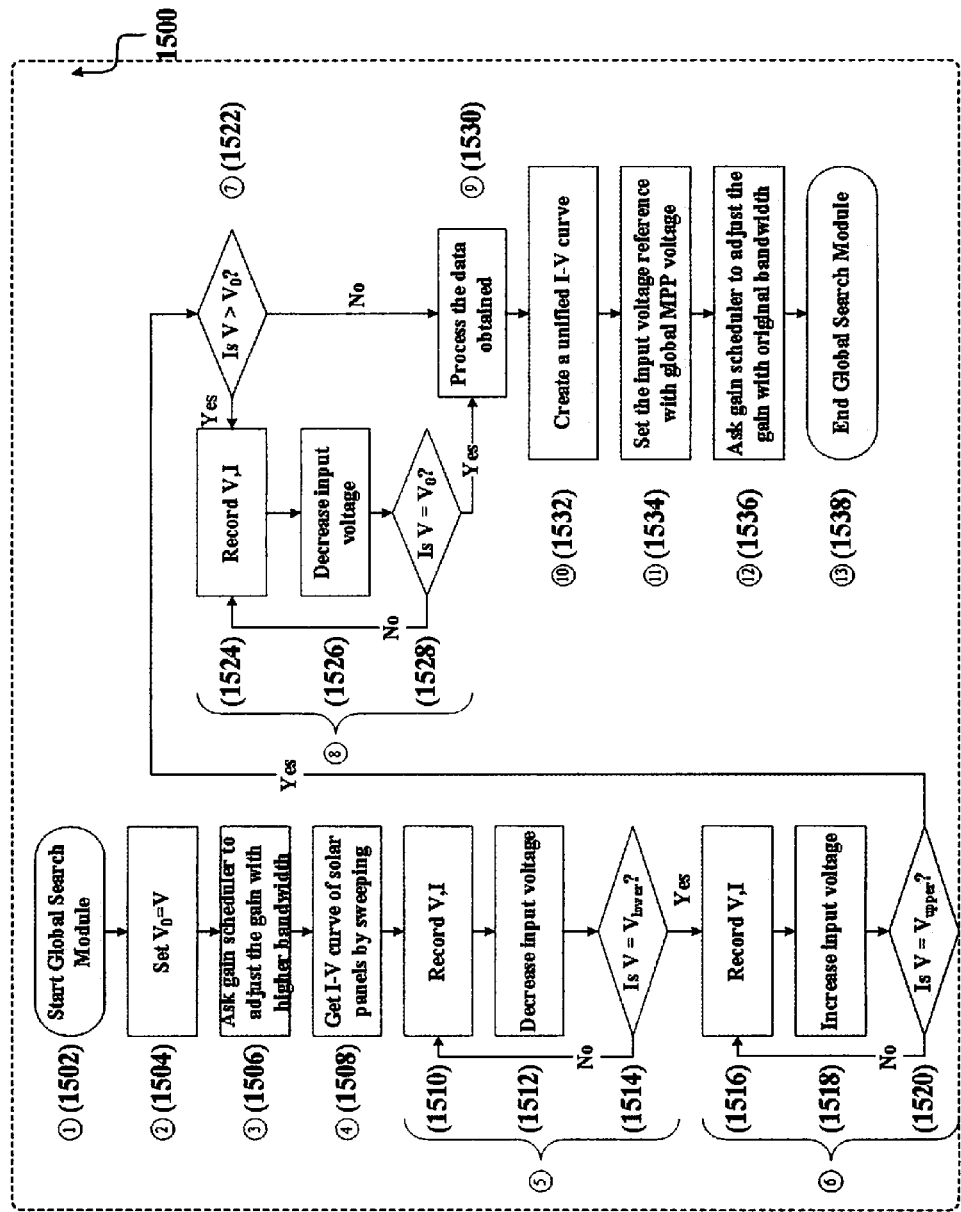
FIG. 15 is a flow diagram of the step of determining a global maximum load power value the method for regulating an electrical power source in accordance with the method of FIG. 14.

Preferably, the global search module will scan entire unified V-I curve and find out the global maximum power point. The corresponding global maximum power voltage value will be assigned to input voltage reference. In an example embodiment, a detailed flow chart of local search module is shown in FIG. 15, and is explained as follows:

1. The global search module is started.
2. Record the voltage and assign it to variable $V_0$
3. Request the gain scheduler to set a high bandwidth profile for DC-bus voltage controller which allows faster transient response
4. Start the sweeping process
5. Obtain the discharging V-I profile by decrease the voltage to $V_{min}$
6. Obtain the charging V-I profile by increase the voltage to $V_{max}$
7. Check if the voltage is greater than $V_0$
8. If the voltage in step 7 is greater than $V_0$, obtain the discharging V-I profile by decrease the voltage to $V_0$
9. Process the curves acquired in step 5, 6 and 8
10. A unified V-I curve is created.
11. Based on the data in step 10, assign the global maximum power point to input voltage reference
12. Request the gain scheduler to set a low bandwidth profile for DC-bus voltage controller which maintain better steady state error.
13. Terminate the global search sequence In some embodiments, Because the speed of sweeping is fast, the change of power over time will be higher than local search module, then for grid-tie inverter, the DC-bus voltage may not be able to sustain its DC-bus voltage reference level because the bandwidth of the control loop of DC-bus voltage controller normally is not high. To tackle this issue, a gain scheduler is added to the system.

There is an output signal coming from global search module which is connected to the gain scheduler. This signal selects the profile of gain scheduler. And the gain scheduler controls the gain parameters of DC-bus voltage controller. Preferably, at initialization stage, 4 profiles are defined in gain scheduler. Depends on the state of global search module, the gain scheduler will adjust the gain according to the profile selected. Then the gain of DC-bus voltage controller is dynamically adjusted. Hence the DC-Bus voltage is stabilized with faster transient response.

Advantageously, the electrical power regulating apparatus provides a method to obtain the a maximum load power value which is approximate to the true maximum load power of a electrical power source, including the global maximum load power value search capability, with high accuracy and speed by the prediction approach, and the MPP value obtained will not oscillate around.

Advantageously, a simulation of the electrical power regulating apparatus in association with a solar panel as an electrical power source has been evaluated.

Figure 8A:
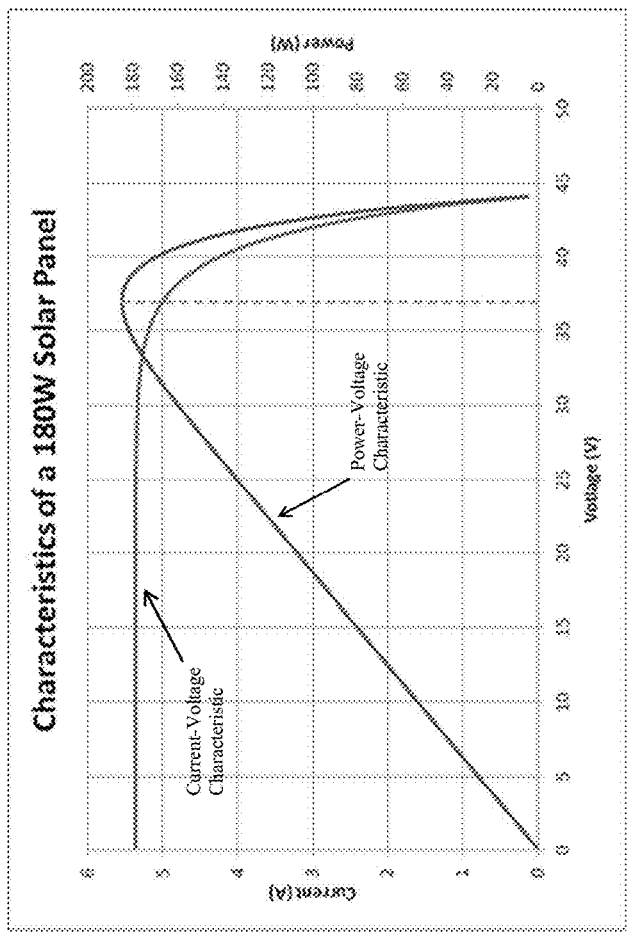
FIG. 8A is a plot diagram showing the electrical characteristics of a solar panel.

With reference to FIG. 8A to 8E, there is shown the simulation results of the electrical power regulating apparatus in association with an 180 W solar panel. The parameters shown as follows,
$I_{ph}=5.36$
$I_o=3.22 \times 10^7$
$nV_t=2.66_5$
$R_{Sh}=0$ As shown in FIG. 8A, The $P_{MPP}$ $V_{MPP}$. The $V_{MPP}$ is 36.94V and $P_{MPP}$ is 184.92.

Figure 8B:
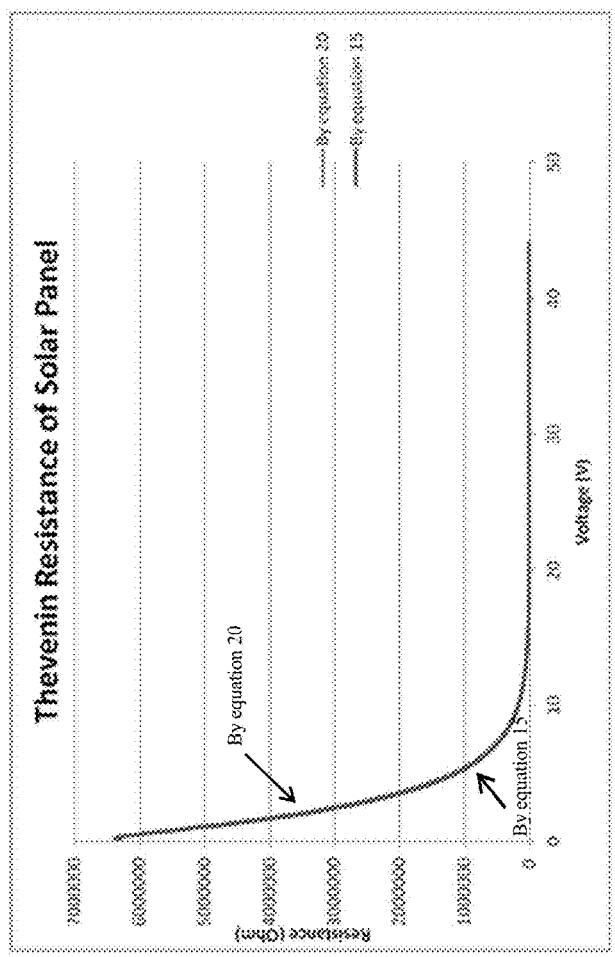
FIG. 8B is a plot diagram showing the Thévenin resistance of a solar panel.

The series of Thévenin resistance of solar panel is calculated by using the equation (15) as well as (20) to proof the correctness of the algorithm. As shown in FIG. 8B, the Thévenin resistance calculated by equation 15 and equation 20 is converged over entire operating range.

Figure 8C:
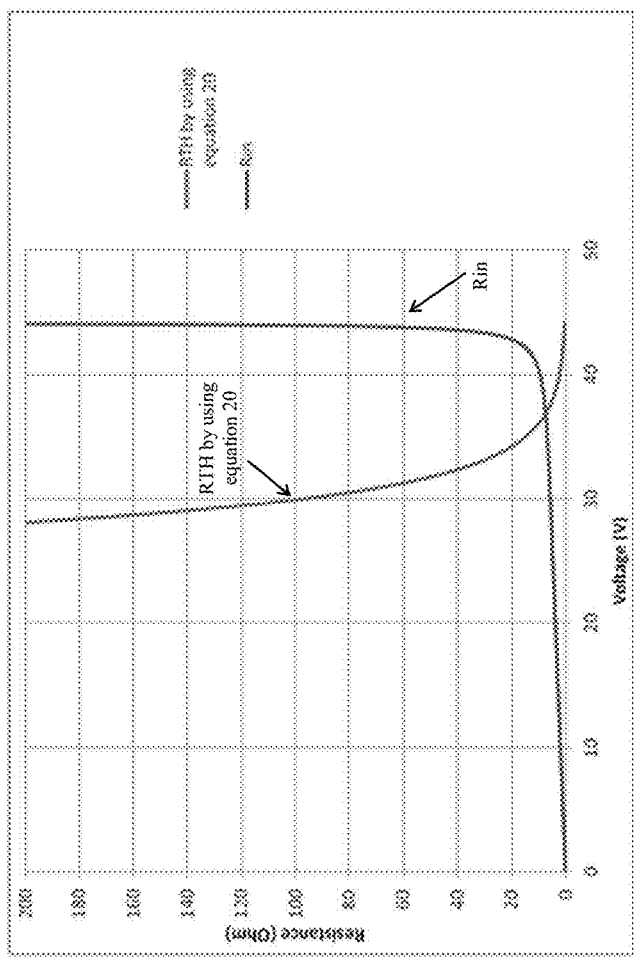
FIG. 8C is a plot diagram showing the Thévenin resistance and the input resistance of a solar panel.
Figure 8D:
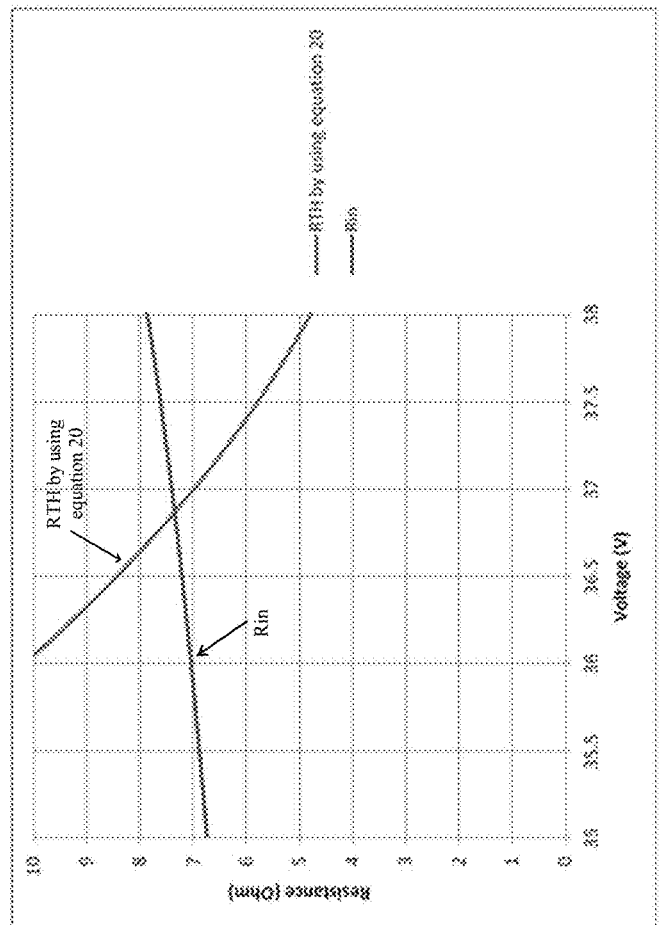
FIG. 8D is an enlarged plot diagram of FIG. 8C showing the Thévenin resistance and the input resistance of a solar panel.

Referring to FIGS. 8C and 8D, $R_{in}$ and $R_{TH}$ are intercepted when the panel voltage equals to 36.8425V. The difference between the true $V_{MPP}$ and this interception point is 0.0975V and the error is 0.26%.

Figure 8E:
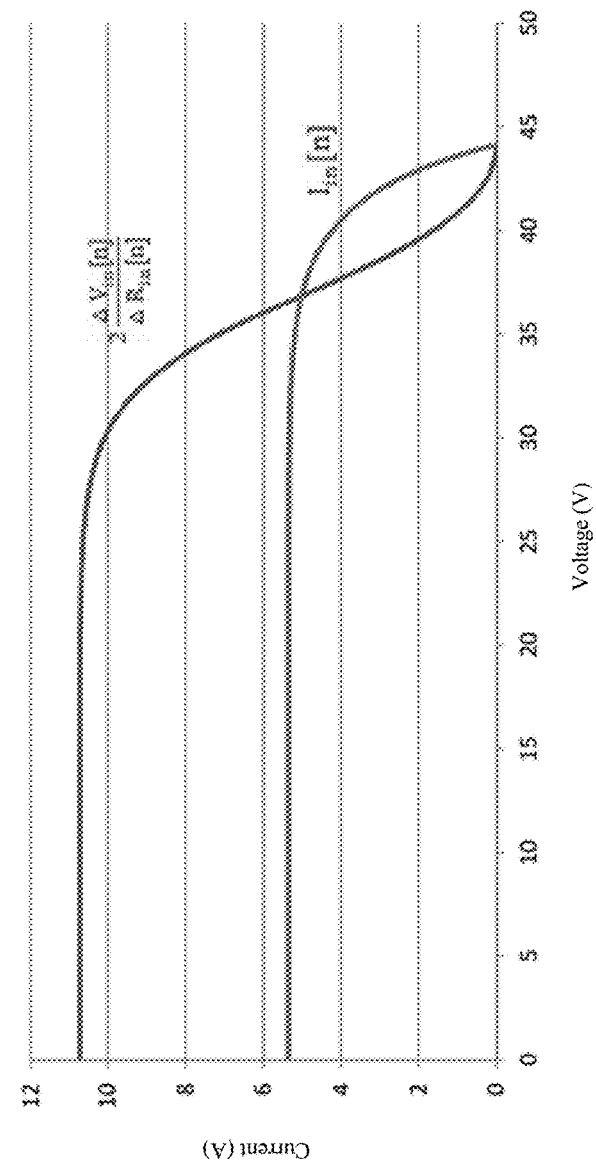
FIG. 8E is a plot diagram showing the current-voltage characteristics of a solar panel.

FIG. 8E shows the magnitude of current and the two times of first derivative of input voltage with respect to input resistance. In the FIG. 8E, when there is a MPP, the magnitude of current and the two times of derivative of input voltage with respect to input resistance are equal. At the right hand side of MPP, the magnitude of current is greater than the two times of derivative of input voltage with respect to input resistance. At the left hand side of MPP, the magnitude of current is lower than the two times of derivative of input voltage with respect to input resistance. The results match to the method listed in Table 1.

Figure 13:
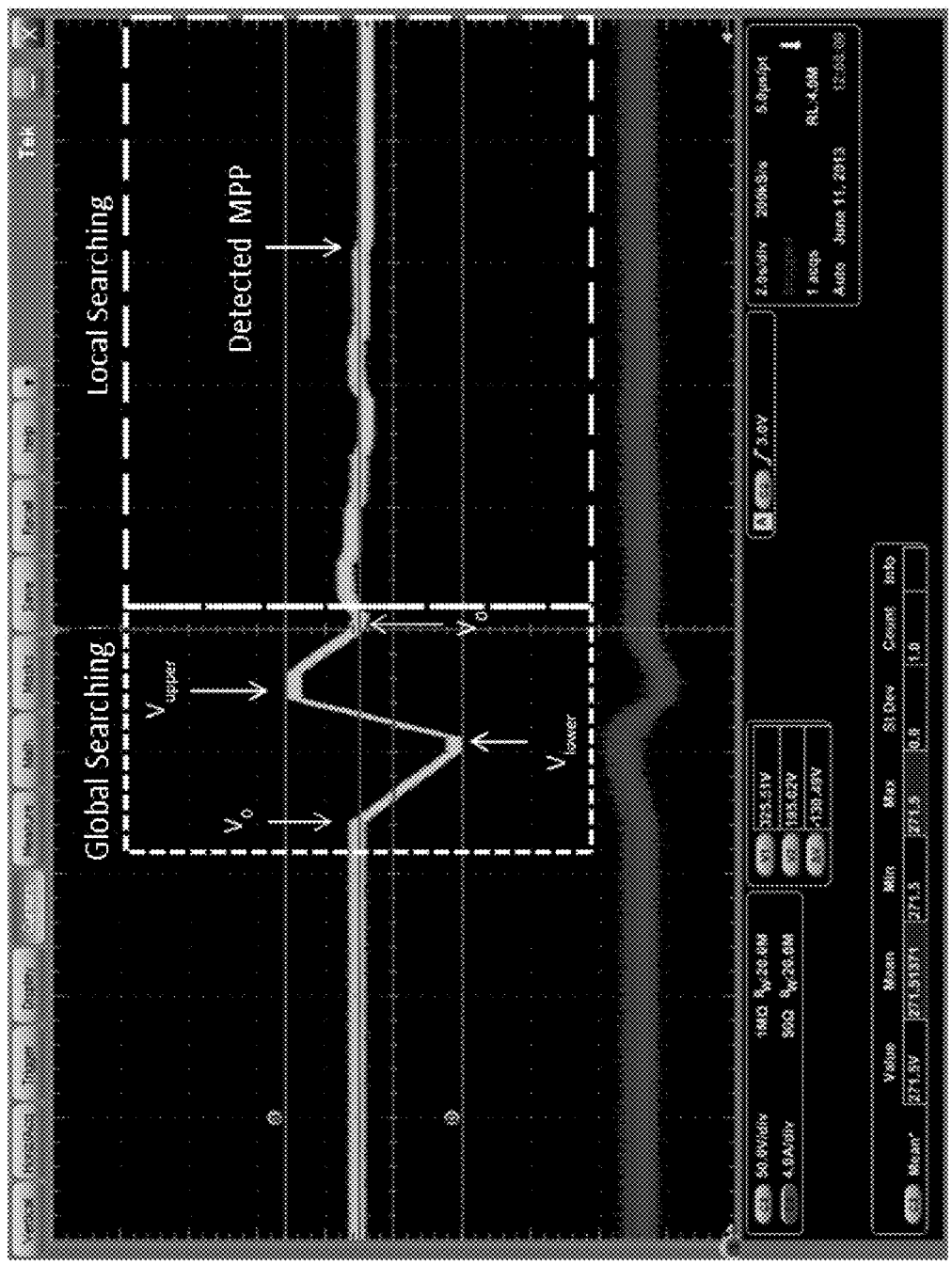
FIG. 13 is a plot diagram showing an experimental result of the method for regulating an electrical power source in accordance with one embodiment of the present invention.
Figure 14:
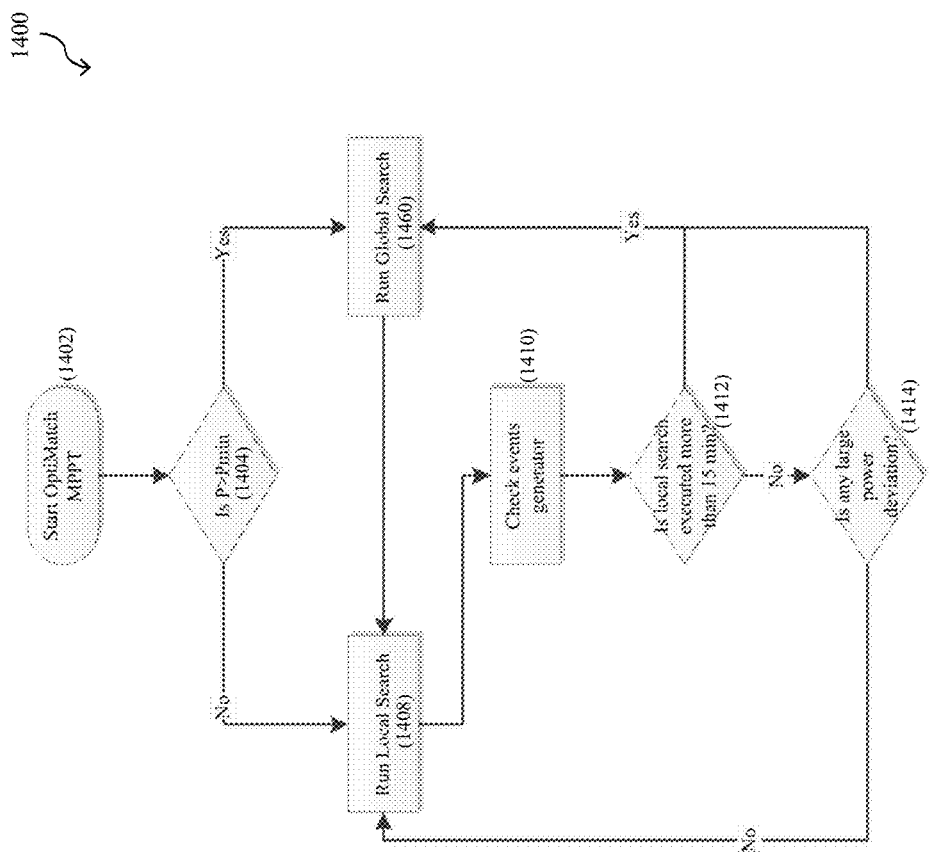
FIG. 14 is a flow diagram of the method for regulating an electrical power source in accordance with one embodiment of the present invention.

With reference to FIG. 13, there is shown an experimental waveform that demonstrates the operation of global search module as well as local search module. The entire process is further illustrated in FIG. 14 which shows a flow diagram of the method of regulating an electrical power source.

Without deviating from the spirit of the invention, the method of regulating an electrical power source can be implemented to regulate any electrical power source, such as one or more solar cell, one or more solar panel, or any other types of electrical power source that may require a dynamic variation in load power such that the electrical power source may operate in a maximum load power condition. In some embodiments, the electrical power regulating apparatus can be implemented to regulate one or more power sources.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for regulating an electrical power source, comprising the steps of:
    detecting one or more predetermined conditions associated with a load power of the electrical power source;
    whereupon the one or more predetermined conditions is detected, acquiring electrical characteristics including an input current-voltage characteristic of the electrical power source to determine a global maximum load power value arranged to approach a true maximum load power of the electrical power source, wherein the input current-voltage characteristic includes a unified current-voltage profile of the electrical power source;
    processing the global maximum load power value to determine a local maximum load power value of the electrical power source; wherein the local maximum load power value is arranged to more closely approach the true maximum load power of the electrical power source when compared with the global maximum load power value;
    wherein the step of acquiring electrical characteristics further includes the steps of:
        reducing a deviation of the input current-voltage characteristic caused by a parasitic capacitance in the electrical power source by sweeping and acquiring the input current-voltage characteristic of the electrical power source by charging and discharging the electrical power source;
    determining the unified current-voltage profile of the electrical power source by averaging a charging characteristic and a discharging characteristic of the electrical power source obtained in sweeping and acquiring the input current-voltage characteristic; and
    updating an input voltage reference value $V_{ref}$ with the global maximum load power value determined, wherein the load power of the power source is varied in association with the input voltage reference value $V_{ref}$;
    wherein determining the local maximum load power further comprises the steps of:
        providing a plurality of discretized parameters of the current-voltage characteristic associated with the Thévenin equivalent circuit of the power source;
        providing a temporary reference voltage Vtemp_ref after determining if the condition for the local maximum load power value is reached; and upon determining that the local maximum load power value is not reached:
            if the next input voltage reference value Vref is determined to be greater than the current value of Vref, the temporary reference voltage Vtemp_ref is equal to Vref+ΔVref; or
            if the next input voltage reference value Vref is determined to be smaller than the current value of Vref, the temporary reference voltage Vtemp_ref is equal to Vref−ΔVref, wherein ΔVref is a predetermined step size for varying the input voltage reference value Vref;
        providing a virtual quadratic profile associated with the discretized parameters of the current-voltage characteristic associated with the Thévenin equivalent circuit of the power source;
        determining and validating an interception point between the virtual quadratic profile and the quadratic profile; and
        updating Vref to a value equal to Vtemp_ref if no valid interception point between the virtual quadratic profile and the quadratic profile has been determined.

2. A method for regulating an electrical power source in accordance with claim 1, wherein the true maximum load power is defined as a maximum available power delivered to an electrical load in association with the electrical power source within a range of operation voltage of the electrical power source operating in an operation condition.

3. A method for regulating an electrical power source in accordance with claim 1, wherein the one or more predetermined conditions includes a predetermined variation in the load power of the electrical power source at an operating voltage.

4. A method for regulating an electrical power source in accordance with claim 1, wherein the one or more predetermined conditions includes reaching a time interval that the electrical power sources has been operating.

5. A method for regulating an electrical power source in accordance with claim 1, wherein determining the global maximum load power further comprises the steps of processing the input current-voltage characteristic acquired for determining the global maximum load power value.

6. A method for regulating an electrical power source in accordance with claim 1, wherein sweeping and acquiring the input current-voltage characteristic further comprising the steps of:
sweeping and acquiring a first period of the input current-voltage characteristic, wherein an input voltage is arranged to sweep from an initial input voltage to a first input voltage;
sweeping and acquiring a second period of the input current-voltage characteristic, wherein the input voltage is arranged to sweep from the first input voltage to a second input voltage; and
sweeping and acquiring a third period of the input current-voltage characteristic, wherein the input voltage is arranged to sweep from the second input voltage to the initial input voltage.

7. A method for regulating an electrical power source in accordance with claim 6, further comprising the steps of:
providing a unified current-voltage profile by:
combining the first period and the third period of the input current-voltage characteristic; and
averaging the second period of the input current-voltage characteristic with the combined first and third period of the input current-voltage characteristic.

8. A method for regulating an electrical power source in accordance with claim 1, wherein the local maximum load power value is determined by further comprising the steps of:
providing a plurality of parameters of a current-voltage characteristic associated to a Thévenin equivalent circuit of the power source.

9. A method for regulating an electrical power source in accordance with claim 8, further comprising the steps of:
processing the parameters of the current-voltage characteristic associated to the Thévenin equivalent circuit of the power source; and
determining if a condition for the local maximum load power value is reached.

10. A method for regulating an electrical power source in accordance with claim 9, further comprising the steps of: providing a threshold value arranged to allow a predetermined tolerance in determining if the condition for the local maximum load power value is reached.

11. A method for regulating an electrical power source in accordance with claim 9, further comprising the steps of:
repeating the steps in accordance with claim 9 whereupon the condition for the local maximum load power value is reached; or
varying the input reference voltage $V_{ref}$ whereupon the condition for the local maximum load power value is not reached, and then repeating the steps in accordance with claim 9 to determine if the condition for the local maximum load power value is reached, wherein the load power is varied in association with the varied $V_{ref}$.

12. A method for regulating an electrical power source in accordance with claim 11, wherein at least one of an accuracy and a speed of the determination of local maximum load power value is increased by transforming the current-voltage characteristic to a quadratic profile associated with the current-voltage characteristic around the local maximum load power value.

13. A method for regulating an electrical power source in accordance with claim 12, wherein at least one of the accuracy and the speed of the determination of local maximum load power value is further increased by providing a prediction of the local maximum load power value by processing at least one of an interpolation relation and an extrapolation relation of the quadratic profile associated with the current-voltage characteristic.

14. A method for regulating an electrical power source in accordance with claim 13, wherein the input reference voltage $V_{ref}$ is varied by a dynamic step size associated with at least one of the interpolation relation and the extrapolation relation.

15. A method for regulating an electrical power source in accordance with claim 12, wherein the quadratic profile is obtained by three or more data points associated with the current-voltage characteristic.

16. A method for regulating an electrical power source in accordance with claim 14, wherein determining the local maximum load power value further comprising the steps of:
recording an input voltage value $V_{in}$ and an input current value $I_{in}$;
varying the input reference voltage $V_{ref}$ with a predetermined step size $\Delta V_{ref}$;
recording the input voltage value $V_{in}$ and the input current value $I_{in}$;
processing the input voltage value $V_{in}$ and the input current value $I_{in}$ and the parameters of the current-voltage characteristic associated to the Thévenin equivalent circuit of the power source;
increasing the input reference voltage $V_{ref}$ with a predetermined step size $\Delta V_{ref}$ whereupon the condition that the local maximum load power value is greater is reached, or decreasing the input reference voltage $V_{ref}$ with a predetermined step size $\Delta V_{ref}$ whereupon the condition that the local maximum load power value is smaller is reached;
recording the input voltage value $V_{in}$ and the input current value $I_{in}$; and
repeating from the processing steps until a predetermined sets of values of the input voltage value $V_{in}$ and the input current value $I_{in}$ are obtained.

17. A method for regulating an electrical power source in accordance with claim 1, further comprising the steps of: repeating a step of processing the local maximum load power value to update the local maximum load power value of the electrical power source.

18. A method for regulating an electrical power source in accordance with claim 17, whereupon the one or more predetermined conditions is detected, processing the local maximum load power value to update the local maximum load power value of the electrical power source.

19. A method for regulating an electrical power source in accordance with claim 1, furthering comprising the steps of:
   remapping an incoming signal to a data structure for the processing at least one of the global maximum load power value and the local maximum load power value;
   assigning the input voltage reference to an input voltage controller for varying the load power of the power source.

20. A method for regulating an electrical power source in accordance with claim 1, furthering comprising the steps of:
   providing a gain scheduler arranged to control one or more gain parameters of a DC-bus voltage controller, wherein the DC-bus voltage controller is operable to control the load power of the electrical power source.

21. A method for regulating an electrical power source in accordance with claim 20, comprising the steps of:
   defining one or more profiles in the gain scheduler, wherein the gain scheduler is arranged to adjust a gain according to the profile selected depending on one or more states associated with the step of determining the global maximum load power value.

22. A method for regulating an electrical power source in accordance with claim 20, wherein the gain scheduler is operable to stabilize a DC-bus voltage of the DC-bus voltage controller with a faster transient response.

23. A method for regulating an electrical power source in accordance with claim 1, further comprising the steps of:
   providing a signal to a DC-DC converter coupled to a photovoltaic device, wherein the DC-DC converter is operable to regulate an output power of a photovoltaic device, wherein the output power is the load power, and wherein the electrical power source is the photovoltaic device.

24. A method for regulating an electrical power source in accordance with claim 1, wherein the method for regulating a load power of an electrical power source is implemented in a digital domain.

25. A method for regulating an electrical power source in accordance with claim 1, wherein, after successful validation of the interception point, the method further comprises the steps of:
   providing a backtrack reference voltage Vbacktrack with a value equal to Vtemp_ref;
   updating Vref to a value associated with the interception point;
   comparing an virtual power value Pvirtual associated with the virtual quadratic profile with a power value Pactual associated with the quadratic profile;
   updating Vref to a value equal to Vbacktrack whereupon the value of Pvirtual is not equal to the value of Pactual.

26. A method for regulating an electrical power source in accordance with claim 25, whereupon the value of Pvirtual is equal to the value of Pactual, further comprising the steps of:
   decreasing Vref with an amount of ΔVref.

27. An electrical power regulating apparatus comprising:
   a controller module arranged to detect one or more predetermined conditions associated with the load power of an electrical power source regulated by the electrical power regulating apparatus;
   a global maximum search module that, when the one or more predetermined conditions is detected, is arranged to acquire electrical characteristics including an input current-voltage characteristic of the electrical power source to determine a global maximum load power value arranged to represent a true maximum load power of the electrical power source, wherein the input current-voltage characteristic includes a unified current-voltage profile of the electrical power source;
   a local maximum search module arranged to process the global maximum load power value to determine a local maximum load power value of the electrical power source; wherein the local maximum load power value is arranged to be more accurate in representing the true maximum load power of the electrical power source when compared with the global maximum load power value;
   wherein the global maximum search module is arranged to acquire the electrical characteristics by reducing a deviation of the input current-voltage characteristic caused by a parasitic capacitance in the electrical power source by sweeping and acquiring the input current-voltage characteristic of the electrical power source upon charging and discharging the electrical power source;
   wherein the input current-voltage characteristic includes a unified current-voltage profile determined by averaging a charging characteristic and a discharging characteristic of the electrical power source, such that the electrical power regulating apparatus reduces a deviation of the input current-voltage characteristic caused by a parasitic capacitance in the electrical power source; and
   wherein the local maximum search module is arranged to update an input voltage reference value $V_{ref}$ with the global maximum load power value determined, wherein the load power of the power source is varied in association with the input voltage reference value $V_{ref}$;
   wherein the local maximum search module is further arranged to determine the local maximum load power by the steps of:
      providing a plurality of discretized parameters of the current-voltage characteristic associated with the Thévenin equivalent circuit of the power source;
      providing a temporary reference voltage Vtemp_ref after determining if the condition for the local maximum load power value is reached; and upon determining that the local maximum load power value is not reached:
         if the next input voltage reference value Vref is determined to be greater than the current value of Vref, the temporary reference voltage Vtemp_ref is equal to Vref+ΔVref; or
         if the next input voltage reference value Vref is determined to be smaller than the current value of Vref, the temporary reference voltage Vtemp_ref is equal to Vref−ΔVref, wherein ΔVref is a predetermined step size for varying the input voltage reference value Vref;
      providing a virtual quadratic profile associated with the discretized parameters of the current-voltage characteristic associated with the Thévenin equivalent circuit of the power source; and
      determining and validating an interception point between the virtual quadratic profile and the quadratic profile; and
   wherein the local maximum search module is further arranged to update Vref to a value equal to Vtemp_ref if no valid interception point between the virtual quadratic profile and the quadratic profile has been determined.

28. An electrical power regulating apparatus in accordance with claim 27, wherein the electrical power regulating apparatus is operable to provide a signal to a power converter coupled to a photovoltaic device, and wherein the power converter is operable to regulate an output power of a photovoltaic device.

29. An electrical power regulating apparatus in accordance with claim 27, wherein the electrical power regulating apparatus is implemented in a digital signal processor (DSP).

* * * * *